United States Patent
Stevens et al.

(10) Patent No.: US 11,729,444 B2
(45) Date of Patent: Aug. 15, 2023

(54) SYSTEM AND METHODS FOR SENSOR-BASED AUDIENCE ESTIMATION DURING DIGITAL MEDIA DISPLAY SESSIONS ON MOBILE VEHICLES

(71) Applicant: Adverge LLC, Dover, DE (US)

(72) Inventors: Albert Stevens, St. Augustine, FL (US); Ibrahim Atiya, Tallahassee, FL (US)

(73) Assignee: Albert Stevens, St. Augustine, FL (US)

( * ) Notice: Subject to any disclaimer, the term of this patent is extended or adjusted under 35 U.S.C. 154(b) by 0 days.

(21) Appl. No.: 17/744,182

(22) Filed: May 13, 2022

(65) Prior Publication Data
US 2022/0279226 A1 Sep. 1, 2022

Related U.S. Application Data

(63) Continuation-in-part of application No. 17/648,451, filed on Jan. 20, 2022, and a continuation-in-part of application No. PCT/IB2020/060733, filed on Nov. 15, 2020.

(51) Int. Cl.
| | |
|---|---|
| *G06V 20/58* | (2022.01) |
| *H04N 21/234* | (2011.01) |
| *H04N 21/442* | (2011.01) |
| *H04N 21/466* | (2011.01) |
| *H04N 21/25* | (2011.01) |
| *H04N 21/258* | (2011.01) |
| *H04N 21/414* | (2011.01) |
| *G06N 3/08* | (2023.01) |
| *G06N 3/045* | (2023.01) |

(52) U.S. Cl.
CPC ........... *H04N 21/252* (2013.01); *G06N 3/045* (2023.01); *G06N 3/08* (2013.01); *H04N 21/25891* (2013.01); *H04N 21/41422* (2013.01); *H04N 21/44213* (2013.01)

(58) Field of Classification Search
CPC .................. H04N 21/41422; H04N 21/44213
See application file for complete search history.

(56) References Cited

U.S. PATENT DOCUMENTS

| | | | | |
|---|---|---|---|---|
| 2019/0101907 | A1* | 4/2019 | Charr | G05B 17/02 |
| 2019/0222885 | A1* | 7/2019 | Cho | G06Q 30/0265 |
| 2020/0288289 | A1* | 9/2020 | Elnajjar | G06Q 30/0265 |
| 2021/0065240 | A1* | 3/2021 | Mandic | G06Q 30/0265 |

* cited by examiner

*Primary Examiner* — Hsiungfei Peng
(74) *Attorney, Agent, or Firm* — Widerman Malek, PL; Daniel C. Pierron

(57) ABSTRACT

A system for providing audience estimation for digital media display sessions displayed on a mobile vehicle, including storage media, a processing system, an interface system including a communications interface, one or more neural networks, and program instructions that the processing system to receive object sensor data, apply an entity classifier thereto to determine a type of each unique audience entity, determine a presence duration of the entity during the digital media display session, and transmit each unique audience entity to an online dashboard.

17 Claims, 12 Drawing Sheets

AUDIENCE ESTIMATION STORE 155

| SESSION ID 930 | AUDIENCE TYPE 931 | AUDIENCE DETECTION TIME 932 | AUDIENCE PROXIMITY 933 | AUDIENCE LOCATION 934 | AUDIENCE DIRECTION 935 | AUDIENCE DETECTION DURATION 936 | AUDIENCE VIEWERSHIP RANK 937 | OBSTRUCTION 938 | OBSTRUCTION COVERAGE 939 | OBSTRUCTION DETECTION TIME 940 |
|---|---|---|---|---|---|---|---|---|---|---|
| 78301 | PEDESTRIAN | 11:00 | 10 | N. MAIN ST. | ONCOMING | 00:10:00 | HIGH | FALSE | NULL | NULL |
| 78301 | CAR | 11:30 | 30 | S. MAIN ST. | CROSSING | 00:15:00 | MEDIUM | TRUE | 10% | 100% |
| 78301 | TRUCK | 11:45 | 30 | PINE AVE | AWAY | 00:05:00 | LOW | FALSE | NULL | NULL |
| 78301 | CYCLIST | 11:45 | 5 | PINE AVE | PARALLEL | 00:25:00 | HIGH | FALSE | NULL | NULL |

FIG. 9A

SESSION STORE 152

| SESSION ID 910 | CLIENT ID 911 | MEDIA ID 900 | MEDIA OWNER ID 945 | DATE 912 | START TIME 913 | STOP TIME 914 | LOCATION / ROUTE 915 | IMAGES / VIDEO 916 | AUDIENCE REACH 917 |
|---|---|---|---|---|---|---|---|---|---|
| 78301 | 335 | 506789 | 679 | 6/15/2019 | 10:45 | 12:00 | MAP-8.MAP | IMAGES.ZIP | 100-150 |

FIG. 9B

USER STORE 153

| CLIENT ID 911 | VEHICLE TYPE 921 | STATUS 922 | UPTIME 923 |
|---|---|---|---|
| 335 | 2016/FORD/SEDAN | ACTIVE | 0:32:12 |

FIG. 9C

SYSTEM AND METHODS FOR SENSOR-BASED AUDIENCE ESTIMATION DURING DIGITAL MEDIA DISPLAY SESSIONS ON MOBILE VEHICLES

RELATED APPLICATIONS

This application claims the benefit of PCT Application Serial No. PCT/IB2020/060733 filed Nov. 15, 2020 and titled "A System and Methods for Sensor-Based Audience Estimation During Digital Media Display Sessions on Mobile Vehicles," which in turn claims priority to U.S. Provisional Application Ser. No. 62/936,251, filed on Nov. 15, 2019; U.S. Provisional Application Ser. No. 62/936,278, filed on Nov. 15, 2019; U.S. Provisional Application Ser. No. 62/942,132, filed on Nov. 30, 2019; U.S. Provisional Application Ser. No. 62/942,173, filed on Dec. 1, 2019; and U.S. Provisional Application Ser. No. 62/945,218, filed on Dec. 8, 2019. This application is also a continuation-in-part of and claims priority to U.S. patent application Ser. No. 17/648,451 filter Jan. 20, 2022 and titled "Sensor-Based Media Display System and Apparatus for Mobile Vehicles," which in turn is a continuation-in-part application of and claims priority under 35 U.S.C. § 111(a) of U.S. Patent Application Serial No. PCT/IB2020/056896 filed on Jul. 22, 2020 and titled SENSOR-BASED MEDIA DISPLAY SYSTEM AND APPARATUS FOR MOBILE VEHICLES, which in turn application of and claims priority under 35 U.S.C. § 119(e) of U.S. Provisional Patent Application Ser. No. 62/878,500 filed on Jul. 25, 2019 and titled SENSOR-BASED MEDIA DISPLAY SYSTEM AND APPARATUS FOR MOBILE VEHICLES. All of the foregoing are incorporated herein by reference in their entirety.

FIELD OF THE INVENTION

The present invention relates to systems and methods for sensor-based audience estimation during digital media display sessions on motor vehicles.

BACKGROUND OF THE INVENTION

Although drivers and passengers of mobile vehicles, as well as pedestrians, have become accustomed to being presented with media on billboards, taxis and buses, many problems remain to be solved in the technical methods used to determine audience engagement with media.

Existing technologies for the presentation of media to persons on or near roadways have lacked methods and structure to support the display of digital media based on dynamic parameters, and the methods and technological features for the estimation of audience levels or viewership of the digital media. Systems and techniques are presented to facilitate the estimated audience viewership statistics for digital media displayed to audiences through the use of mobile vehicles. The technological features described herein support estimation of audience size, type, and quality in dynamically changing physical, real-world viewing environments using object sensor arrays and other novel component arrangements.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the invention are directed to a system for providing audience estimation for digital media display sessions displayed on a mobile vehicle, comprising: non-transitory computer-readable storage media; a processing system; an interface system, including a communications interface; program instructions stored on the computer-readable storage media that, when executed by the processing system, direct the processing system to: receive, via the communications interface, object sensor data derived from a media display client apparatus during a digital media display session; apply an entity classifier to the object sensor data to determine a type of each unique audience entity; for each unique audience entity: determine, from the object sensor data, a presence duration of the entity during the digital media display session; determine, from the object sensor data, a proximity, a speed, and a direction of the entity to at least one client display of the media display client apparatus; determine, from the object sensor data, an attention level of the entity to the at least one client display of the media display client apparatus; and compute an audience entity quality rating according to the type, the presence duration, the proximity, the speed, the direction, and the attention level of the audience entity.

Additional embodiments of this system comprise: further program instructions that, when executed by the processing system, further direct the processing system to: detect, from the object sensor data, view obstruction of the at least one client display of the media display client apparatus and determine obstruction duration and obstruction coverage; and adjust, for each unique audience entity, the audience entity quality rating according to the obstruction duration and obstruction coverage of the at least one client display.

This Brief Summary is provided to introduce a selection of concepts in a simplified form that are further described below in the Detailed Description. The Brief Summary is not intended to identify key features or essential features of the claimed subject matter, nor is it intended to be used to limit the scope of the claimed subject matter.

BRIEF DESCRIPTION OF THE DRAWINGS

Some embodiments of the present invention are illustrated as an example and are not limited by the figures of the accompanying drawings, in which like references may indicate similar elements.

FIG. 9A shows an example representation of an audience estimation store, organized as a table in a relational database.

FIG. 9B shows an example representation of a session store, organized as a table in a relational database.

FIG. 9C shows an example representation of a user data store, organized as a table in a relational database.

DETAILED DESCRIPTION OF THE INVENTION

Figure 1:
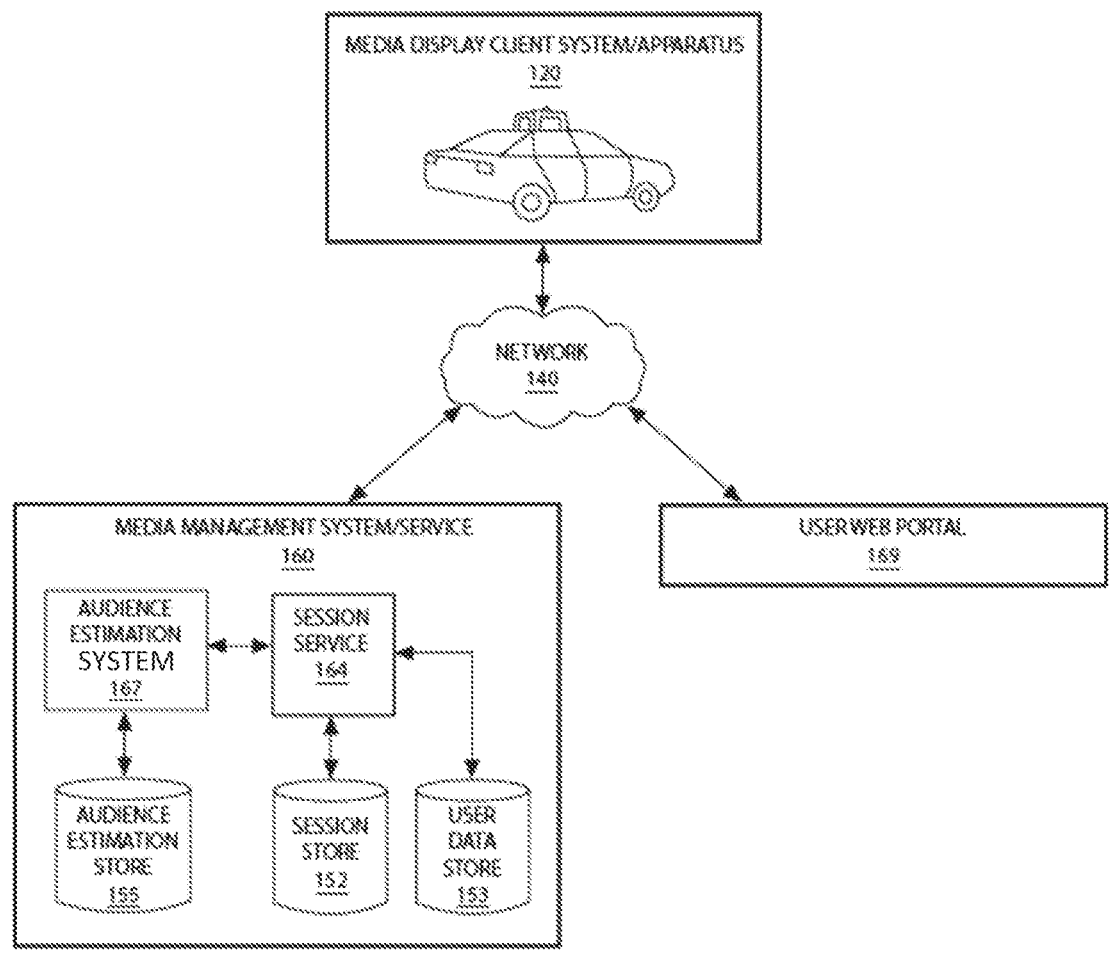
FIG. 1 shows a high-level example of a system/component environment in which some implementations of systems, apparatuses, and techniques for sensor-based audience estimation in relation to digital media display management can be carried out.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a Existing technologies for the presentation of digital media to persons on or near roadways have lacked methods and structure to support the display of digital media based on dynamic parameters, and the methods and technological features for the estimation of audience levels or viewership of the digital media. Examples of media sessions include advertisements, public service announcements, entertainment offerings, and instructions and warnings. Systems and techniques are presented to facilitate the estimated audience viewership statistics for digital media sessions displayed to audiences through the use of mobile vehicles. The technological features described herein support estimation of audience size and quality in dynamically changing physical, real-world viewing environments.

Initially, it is relevant to explore the system environment in which a media display client system/apparatus for displaying a digital media display session is implemented. FIG. 1 shows a high-level example of a system/component environment in which some implementations of systems and techniques for audience viewership analysis to be obtained on sensor-based media display performed on mobile vehicles can be carried out. In brief, media display client system/apparatus 120 connects to a media management system/service 160 via network 140. User web portal 169 maintains connectivity to the media display client system/apparatus 120 and/or the media management system/service 160 via network 140. Any of the system components, services, functions, methods, and/or data stores can be contained wholly or spread across any of the system options including the vehicle system 100A-100C (FIGS. 1A-1C), the media display client system 120A-120C (FIGS. 1A-1C), or the media management system 160. This enables systems and techniques disclosed herein to be implemented using a wide variety of system models, including cloud computing and multi-tiered architectures.

Figure 1A:
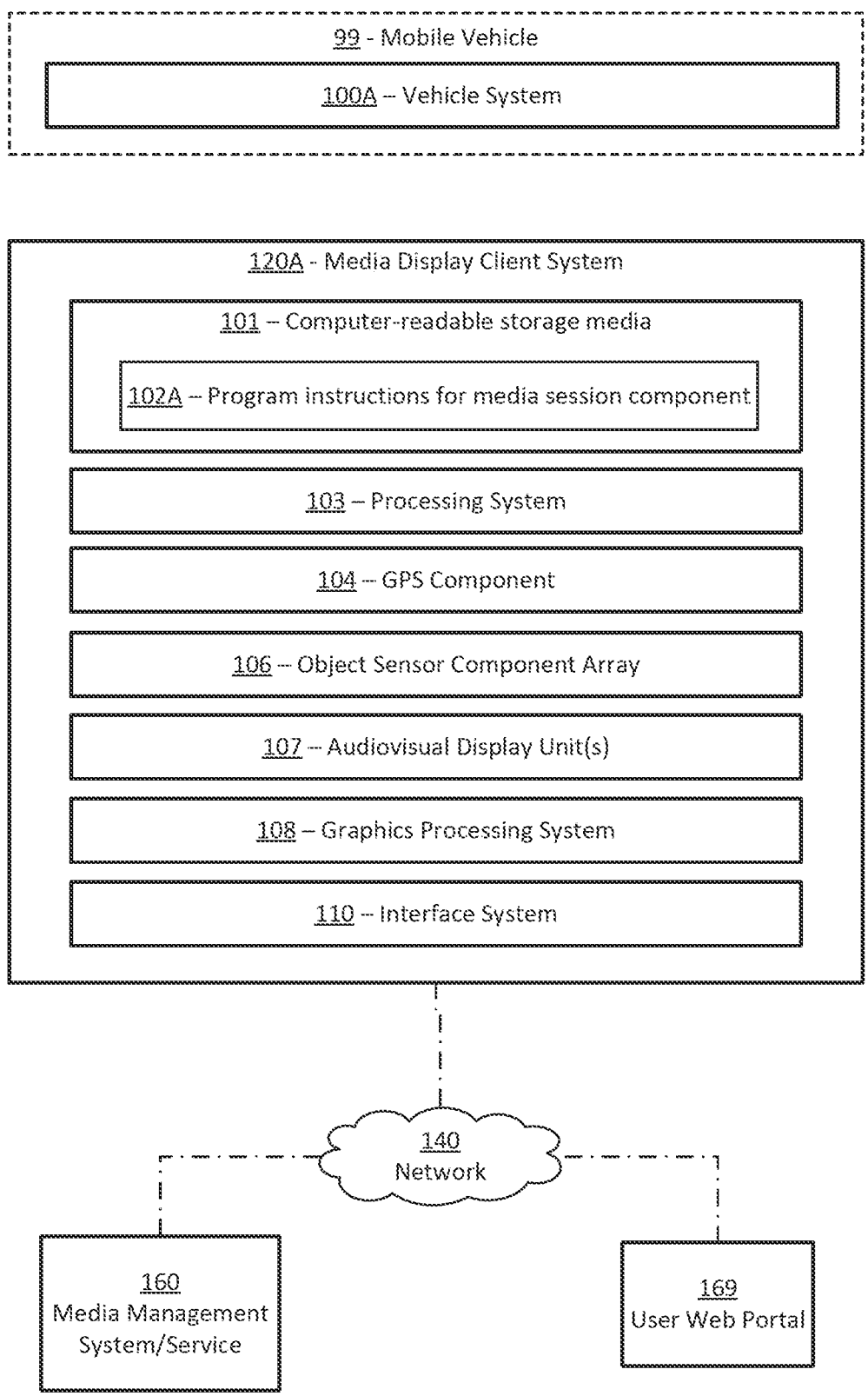
FIGS. 1A-1C show examples and embodiments of system/component environments that have varying configurations of media display client systems.

FIG. 1A, a variant of the high-level system model of FIG. 1, shows an example a system/component environment in which some implementations of systems and techniques for audience viewership analysis to be obtained on sensor-based media display utilizing mobile vehicles can be carried out. FIG. 1A describes a system implementation in which the mobile vehicle's technological capabilities are separate from the technological capabilities of the media display client system 120A. In brief, the media display client system 120A obtains sensor data that is sent to the media management system/service 160 via network 140. User web portal 169 connects to both the media display client system/apparatus 120 and the media management system/service 160 via network 140. This system implementation does not use any of the vehicle system 100A capabilities. The media client system/apparatus 120A acts as a stand-alone system that transported or housed on or within a mobile vehicle 99, but which is not connected to the mobile vehicle technical systems. Further discussion of the detailed component capabilities of FIG. 1A is provided below.

Figure 1B:
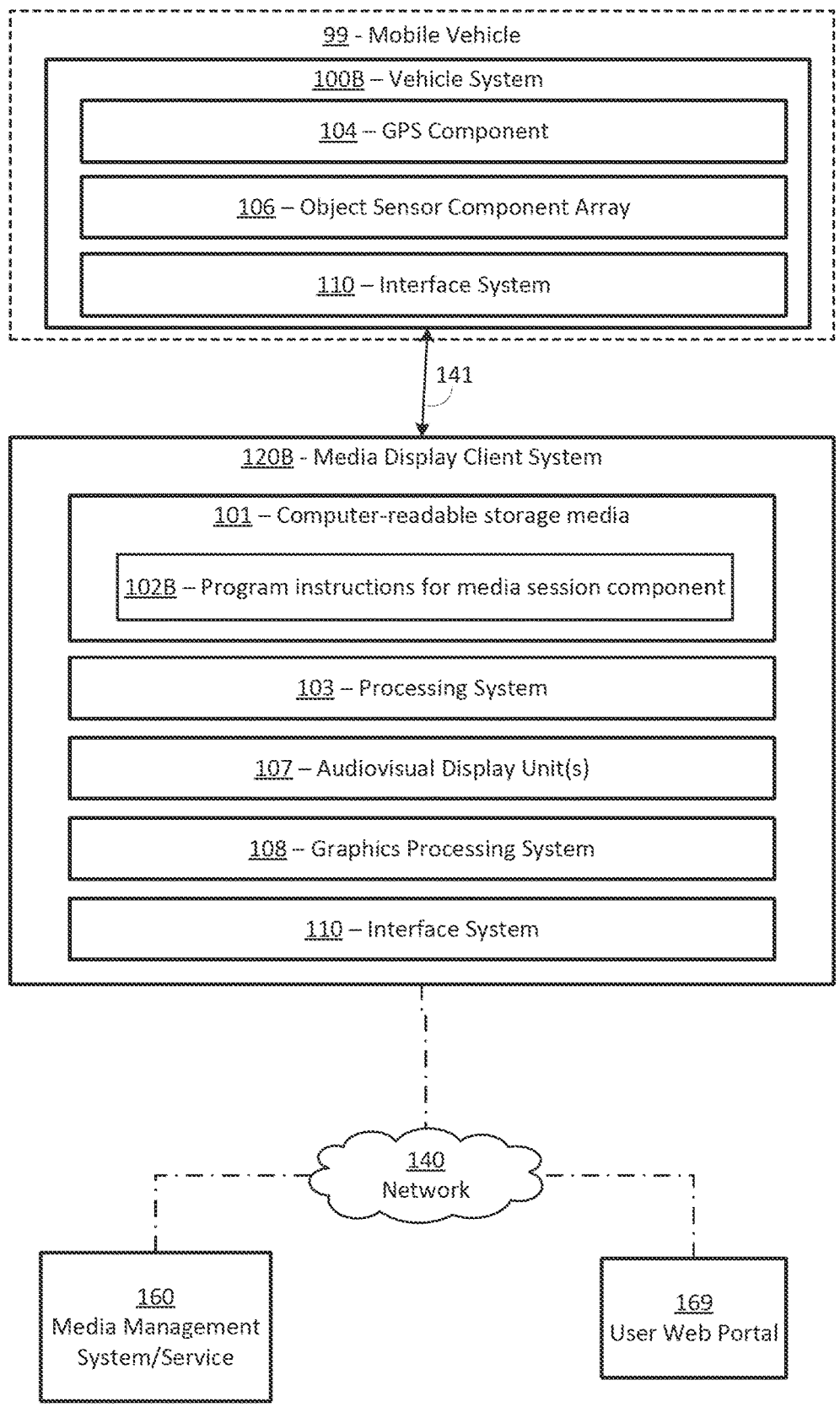

FIG. 1B, a variant of the high-level system model of FIG. 1, shows an example of a system/component environment in which some implementations of systems and techniques for audience viewership analysis to be obtained on sensor-based media display utilizing mobile vehicles can be carried out. FIG. 1B describes a system implementation in which the mobile vehicle's technological capabilities are shared with the media display client system 120B. In brief, the media display client system 120B obtains sensor data from the vehicle system 100B, via connection 141, which is sent to the media management system/service 160 via network 140. User web portal 169 connects to both the media display client system/apparatus 120 and the media management system/service 160 via network 140. This system implementation combines the vehicle system 100B component capabilities with the media client system/apparatus 120B component capabilities, form the consolidated component capabilities of the media display client system 120. Further discussion of the detailed component capabilities of FIG. 1B is provided below.

Figure 1C:
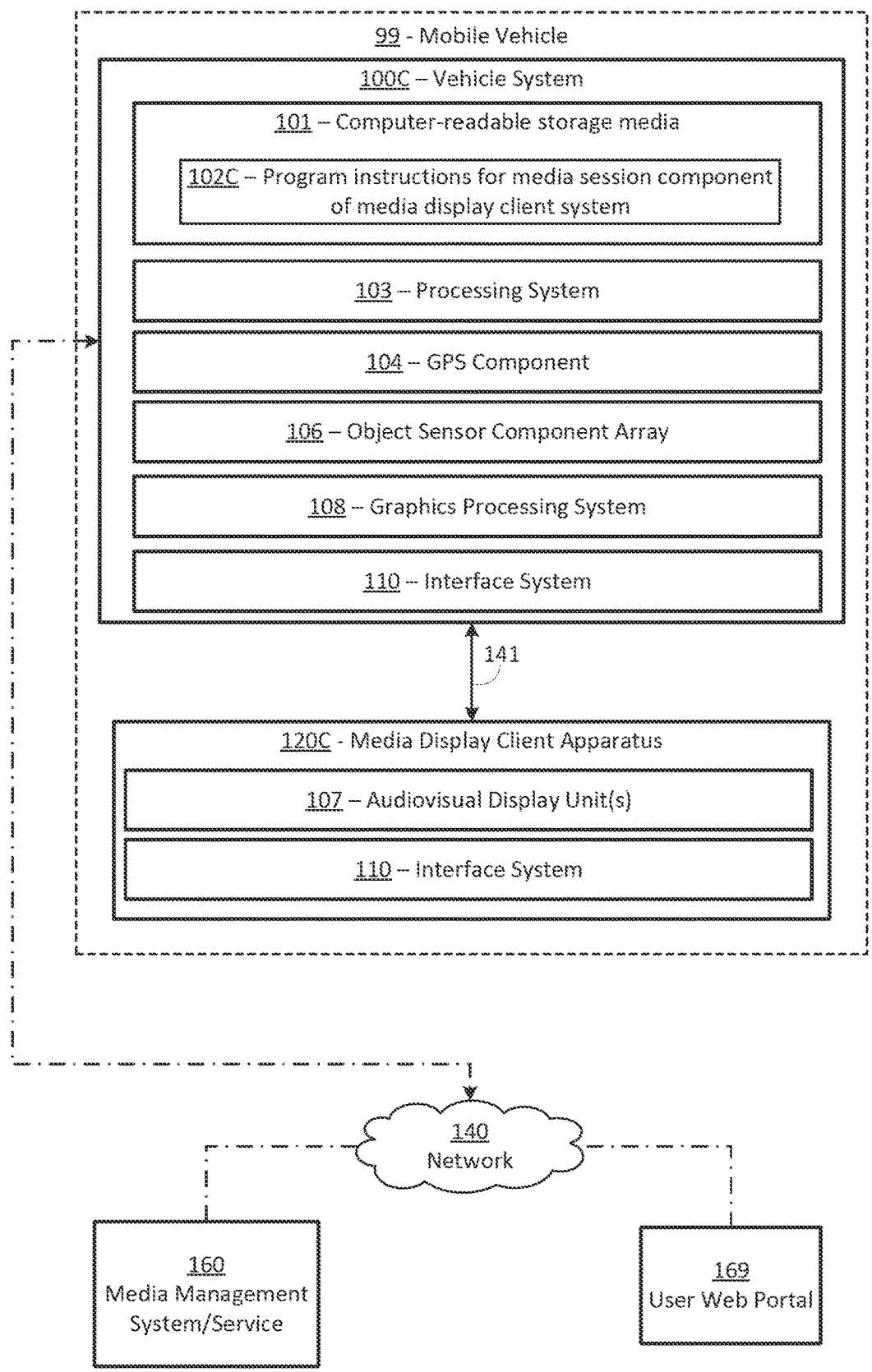

FIG. 1C, a variant of the high-level system model of FIG. 1, shows an example of a system/component environment in which some implementations of systems and techniques for audience viewership analysis to be obtained on sensor-based media display utilizing mobile vehicles can be carried out. FIG. 1C describes a system implementation in which certain of the mobile vehicle's technological capabilities are shared with the technological capabilities described in this invention. In brief, the media display client system 120 obtains sensor data from the vehicle system 100C, via connection 141, which is sent to the media management system/service 160 via network 140. User web portal 169 connects to both the media display client system/apparatus 120 and the media management system/service 160 via network 140. This system implementation utilizes the vehicle system 100C as the primary source of system components for the media display client system 120, with the media display client apparatus 120C providing primarily media display using audiovisual display unit(s) and housing. Further discussion of the detailed component capabilities of FIG. 1B is provided below.

Figure 2:
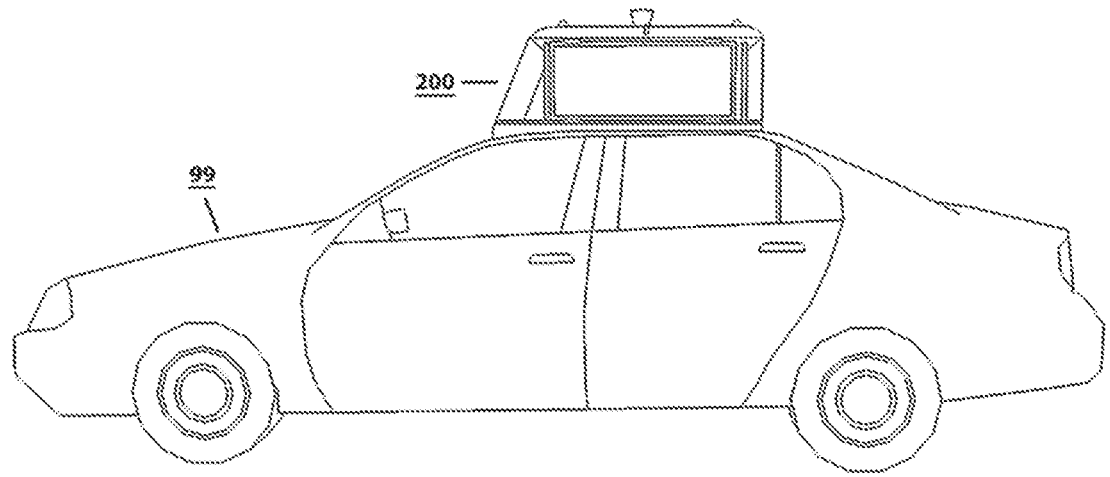
FIG. 2 shows an example view of a media display client apparatus mounted on a mobile vehicle.

FIG. 2 shows an example of a mobile vehicle 99 with an attached media display client system/apparatus 200, which contains components according to the variations in FIGS. 1-1C to receive and display digital media as well as provide object sensor data for audience estimation and audience viewership analysis in relation to the displayed digital media.

Returning to FIG. 1, either the media management system/service 160 or the media display client system/apparatus 120 can perform various activities, such as analysis of media session sensor data for audience detection statistics, ranking each individual audience viewership based on specific audience detection statistics, collating the audience detection statistics to provide total audience estimation values, and updating the media session package that will supply the user web portal 169 with pertinent data about the media session for users to view. Example process flows and visual examples describing the processing activities of both the media management system/service 160 and the media display client system/apparatus 120 are described in more detail in FIGS. 3-7.

In some embodiments, other subcomponents/subservices of 160, such as a session service 164, perform activities related to processing a session data package received from a media display client system 120—containing, for example, audience estimation data and other telemetry. A session data package may be stored by the session service 164 in a session store 152, for example (the discussion surrounding FIG. 9B describes a session store in more detail).

Either or both services 167 and 164, and/or other subcomponents of the media management system/service 160 may interact with a user data store 153, which contains user-operator account data, configuration data, and other properties of each of the media display client system(s) 120 registered to use the media management service (the discussion surrounding FIG. 9C describes a user data store in more detail).

Either or both services 167 and 164, and/or other subcomponents of the media management system/service 160 may interact with an audience estimation store 155, which contains audience statistics from media display sessions performed on media display client system(s) 120 (the discussion surrounding FIG. 9A describes an audience estimation store in more detail).

User web portal 169 may provide a user-operator of a media display client system/apparatus 120 or a user associated with media being displayed on 120 with various audience viewership statistics derived from media display sessions. The user web portal 169 connects to either the media management system/service 160 or the media display client system/apparatus 120 to receive updated media display session data including audience viewership statistics. User web portal 169 may interact with subcomponents of the media management system/service 160, such as a user data store 153, to modify user-operator account information, a session store 152, to receive updated session information, and an audience estimation store 155, to receive audience viewership statistics.

User web portal 169 is an interface that can be accessed over a network and viewed through a mobile application, a web browser application, or a dedicated computing application. Non-limiting examples devices than can be used to interact with a user web portal 169 mediums include a computing system, desktop computer, mobile device, tablet device, mobile phone, wearable, an interface screen that is dash-mounted inside the mobile vehicle, and in-dash interface device installed in the mobile vehicle running software that provides the user interface elements, including any other devices that can use a web browser to access a web page, or that have an "app" (or other software applications), to connect to a cloud service interface over the network 140.

Network 140 can include, but is not limited to, a cellular network (e.g., wireless phone), a point-to-point dial up connection, a satellite network, the Internet, a local area network (LAN), a wide area network (WAN), a Wi-Fi network, an ad hoc network, a Bluetooth network, or a combination thereof. Such networks are widely used to connect various types of network elements, such as hubs, bridges, routers, switches, servers, and gateways. The network may include one or more connected networks (e.g., a multi-network environment) including public networks, such as the Internet, and/or private networks such as a virtual private network or secure enterprise private network. Access to the network may be provided via one or more wired or wireless access networks as will be understood by those skilled in the art. Media display client system/apparatus 120, media management system/service 160, and user web portal 169 may connect to network 140 by employing one or more elements of a communications interface. Computing system and device components supporting network connectivity via a communications interface are described in detail with respect to FIG. 11.

In embodiments, components or subcomponents of the media display client system/apparatus 120 and the user web portal 169 facilitate the interaction between the media display client system/apparatus 120 (and/or user web portal 169) and the media management system/service 160, for example through an application programming interface (API) of the media management system/service 160. An "API" is generally a set of programming instructions and standards for enabling two or more applications to communicate with each other. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API and related components may be stored in one or more computer readable storage media. An API is commonly implemented as a set of Hypertext Transfer Protocol (HTTP) request messages and a specified format or structure for response messages according to a REST (Representational state transfer) or SOAP (Simple Object Access Protocol) architecture. JSON-formatted and XML-formatted content is often returned to the API-calling component in response messages.

It should be noted that, while sub-components of media management system/service 160 are depicted in FIG. 1, this arrangement of the media management system/service 160 into components is exemplary only; other physical and logical arrangements of a media management system/service capable of performing the operational aspects of the disclosed techniques are possible. Various types of physical or virtual computing systems may be used to implement the media management system/service 160 (and related example subcomponents 167, 164, 152, 153, and 155) such as server computers, desktop computers, cloud compute server environments, laptop computers, tablet computers, or any other suitable computing appliance. When implemented using a server computer, any of a variety of servers may be used including, but not limited to, application servers, database servers, mail servers, rack servers, blade servers, tower servers, virtualized servers, or any other type of server, variation of server, or combination thereof. A computing system or device that may be used in some environments to implement a media management system/service 160 is described in FIG. 11. Further, it should be noted that aspects of the media management system/service 160 may be implemented on more than one device. In some cases, media management system/service 160 may include components located on media display client system/apparatus device(s) 120, and/or on one or more services implemented on separate physical devices. For example, a subset of a session store 152 that has been cached or replicated may exist on media display client system/apparatus 120 to provide caching of media, lowering network bandwidth demands.

Figure 11:
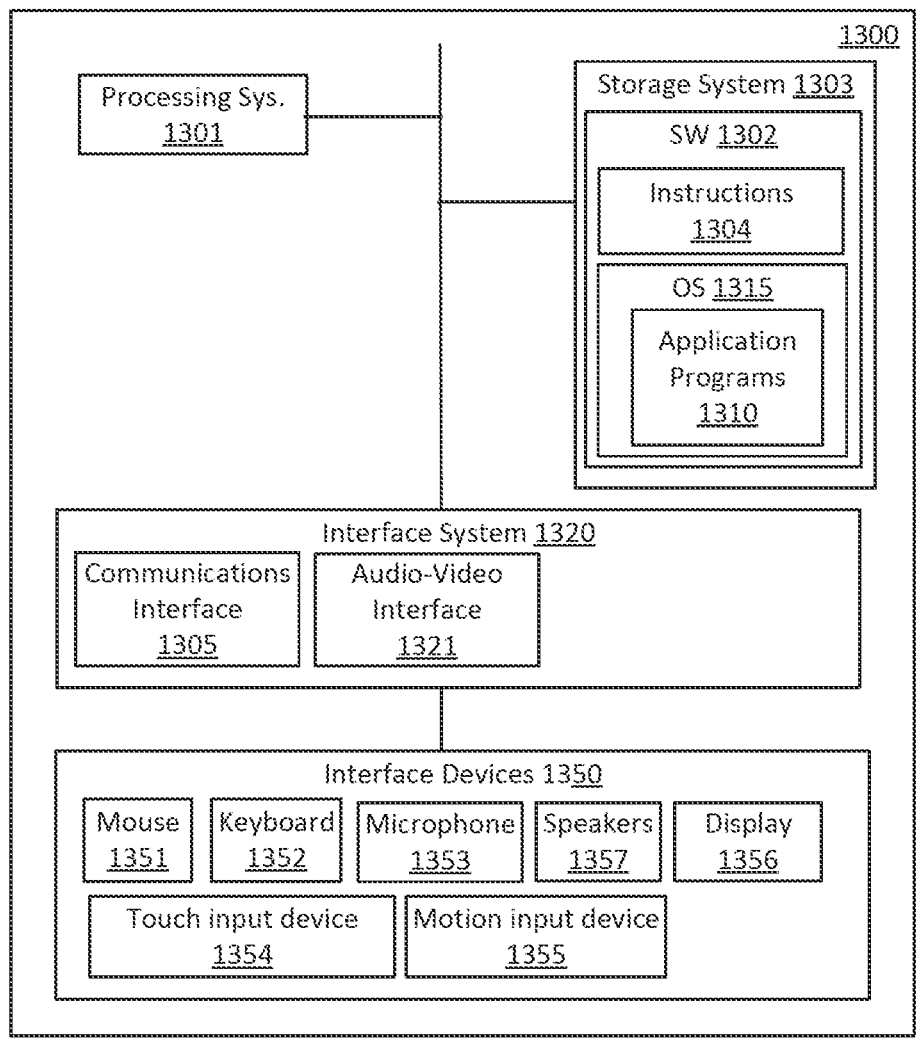
FIG. 11 shows a block diagram illustrating components of a computing device or system used in some embodiments of techniques, systems, and apparatuses for sensor-based audience estimation in relation to digital media display management.

Media display client system 120A is an example of a computing device or system having certain components as described in regard to FIG. 11. System 120A includes system components such as computer-readable storage media 101, on which program instructions for a media session component 102A are stored, and processing system 103, which executes the program instructions 102A, transforming the general-purpose computing device into a specific media display client system 120A for displaying media packages and obtaining media session sensor data.

Example media display client system 120A includes a GPS component 104. GPS component 104 may be utilized to access a GPS service in order to obtain location, time, speed, direction, and distance data about the mobile vehicle that the media display client system 120A is affixed or installed upon. Processes utilizing GPS component 104 data points are described in relation to FIG. 4.

Object sensor component array 106 includes one or more devices or components capable of detecting the presence of an object of interest in a particular proximity to the mobile vehicle 99. An object of interest includes other vehicles conveying human observers (e.g., passenger vehicles, public transport, trucks, vans, motorcycles), other forms of transportation conveying human observers (e.g., cyclists, skateboards, scooters), and human observers that are pedestrians. Data collected about an object of interest can include a data-defined signature that indicates the type of object (e.g., vehicle, vehicle type, human being), the object's direction, the object's speed, and the distance of the object of interest from the object sensor. This data may be used, for example, to perform audience detection/estimation as well as to record the duration the object remains within the optimal viewing distance from the object sensor, as described further in regard to FIGS. 4-7. The proximity of an object of interest as an audience member may vary in accordance with dynamic factors relating to the characteristics of a specific instance of a media display client system, including, for example, the type and capabilities of object sensor, the size, clarity, or brightness of the audiovisual display unit(s), and local viewing conditions (e.g., viewing conditions affected by weather).

Object sensors can take a variety of forms, including RADAR, LIDAR, and camera components, as well as audio sensors/microphones.

LIDAR object sensor(s) can be used to accurately determine the distance of an object from the LIDAR sensor. In some cases, object type analysis can be performed using LIDAR data. Different types of LIDAR include, for example, mechanical lidar and solid state lidar.

RADAR-type object sensor(s) can be used to determine the speed, distance, and/or direction of objects near the mobile vehicle 99 conveying the media display client system. In some embodiments, RADAR data may be analyzed to determine the shape of objects in order to classify them by object type.

Camera components include one or more cameras capable of capturing an image or video from an outbound viewpoint from the apparatus (e.g., 200 of FIGS. 8A-8B) affixed to the mobile vehicle 99 on which the apparatus is housed. In some embodiments, the camera components include at least one camera operative to capture a still image or video from an outbound viewpoint of at least one of the audiovisual display unit(s) 107 (see, for example, the outbound viewpoint of apparatus 200 shown in FIG. 8A).

Figure 4:
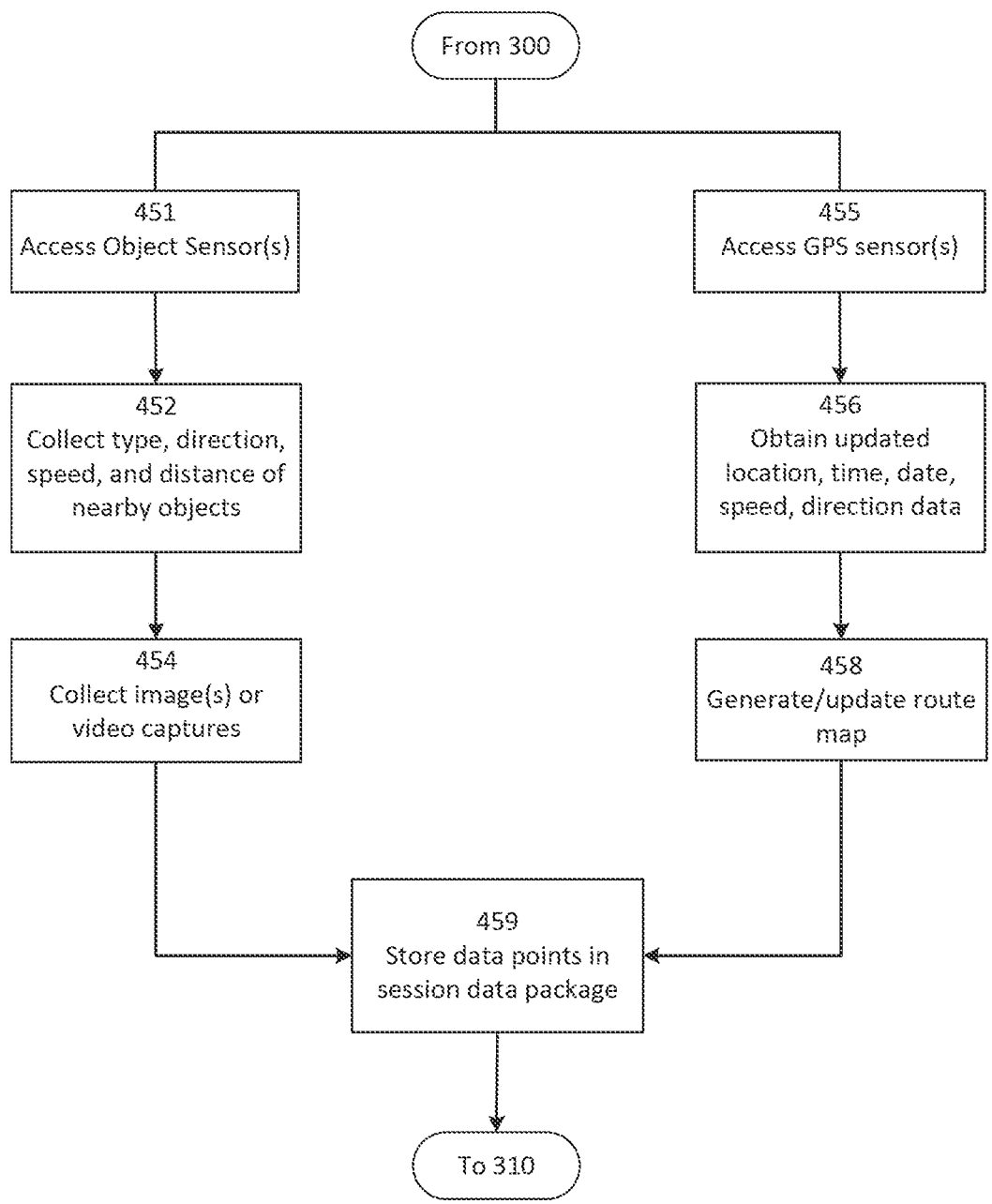
FIG. 4 shows an example sub-process flow for activities related to monitoring the media session for relevant object sensor data for audience estimation.

Camera components implement the visual imagery data-gathering aspect for performing audience detection, e.g., detection of the existence of human observers of the media via the periodic capturing of images and/or video, the process of which capturing is described with regard to FIG. 4. In some embodiments, images and/or video captures from camera components are used to classify objects into object types that are relevant to audience estimation. For example, images and video captures may be analyzed to perform face identification and eye gaze tracking within the image or videos, indicating the presence of an audience member within viewing range of the selected media.

In certain embodiments, camera components implement the visual imagery data-gathering aspect for performing obstruction detection, e.g., detection of the existence of obstructions to the audiovisual displays, such as other vehicles, trees, roadway structures, signs, debris, or sun glare, that may impede the viewing of the media being displayed on the audiovisual display(s) by human observers in one or more viewing angle relations to the audiovisual display(s) 107.

The object sensor component array 106 can be made up of many combinations of forms of object sensor, for example, RADAR only, LIDAR only, camera components only, RADAR and LIDAR, RADAR and camera components, LIDAR and camera components, and RADAR, LIDAR, camera components, and audio sensors (i.e., all four types). The object sensor components forming the object sensor component array 106, including those of the same object sensor type (e.g., camera, LIDAR, RADAR), may also be part of various systems; i.e., certain object sensor components may be part of the media display client system, while other object sensor components are leveraged from the vehicle system (see, e.g., FIGS. 1A-1C).

In examples and embodiments, object sensors comprising the object sensor component array 106 are located variously, including on the mobile vehicle 99 (e.g., webcams and similar devices, LIDAR units, and RADAR units mounted on the roof top, sides, hood, trunk enclosure, truck bed enclosure (or "topper") roof, sides, or back, pickup tailgate or latch, or other external surface; within the external frame of the mobile vehicle 99, such as inside the front grill, in the rear frame, as for a backup camera, or other frame location) and within the mobile vehicle 99 (e.g., placed in the rear or front window dashboard area, mounted to a side window, within the bed of a "pickup truck," or tailgate or latch of the pickup truck bed). Additional examples and embodiments locate one or more object sensors affixed to or within the media display client apparatus itself, such as mounted on the external top or sides of the media display client apparatus, or within the protective enclosure of the media display client apparatus. In some examples (see, e.g., FIGS. 1B-1C), one or more object sensors in the object sensor component array 106 are installed on the mobile vehicle 99 and are utilized by interacting through an interface system 110 with software components installed the mobile vehicle system (e.g., 100B and 100C from FIGS. 1B and 1C, respectively).

Media display client system 120A includes one or more audiovisual display(s) 107 affixed to an apparatus affixed to the body of the mobile vehicle 99. Audiovisual display(s) 107 are operable to render/display digital media storages, files, and streams as images and/or video. In some embodiments, audiovisual display units also include speakers for rendering standalone audio media and/or the audio track of digital video media formats. Examples of audiovisual display(s) 107 include CRTs, LCD and LED displays and their various subtypes, instantiated in devices such as computer monitors/displays, televisions, touchscreen displays, tablets, etc. An audiovisual display 107 can be comprised of multiple, separate physical components, such as when the visual display component and speaker components for producing audible sounds are separated physically but connected by an interface to a common computing system. In some embodiments, an audiovisual display 107 can be comprised of a semi-transparent surface on which an image is projected from an image-producing device (e.g., a portable projection device) behind it.

The one or more audiovisual display(s) 107 may be affixed to the apparatus in a rear-facing aspect (i.e., facing outward from the back of the mobile vehicle, such that a driver or pedestrian behind the mobile vehicle can see the rear-facing audiovisual display). One or more audiovisual display(s) 107 may be mounted within the apparatus in a side-facing aspect (i.e., facing outward from the side of the mobile vehicle, such that a driver or pedestrian on the left or right side of the mobile vehicle can see the side-facing audiovisual display). One or more audiovisual display(s) 107 may be affixed to the apparatus in a front-facing aspect (i.e., facing outward from the front of the mobile vehicle, such that a driver or pedestrian in front of the mobile vehicle can see the front-facing audiovisual display). One or more audiovisual display(s) 107 may be affixed to the apparatus in an upward-facing aspect (e.g., to allow viewers in buildings with higher floors to see the media) and/or a downward-facing aspect (e.g., to allow viewers situated lower than a taller mobile vehicle such as a truck to see the media). Any combination of rear-facing, side-facing, front-facing, and/or upward-facing and downward-facing audiovisual displays are possible, so long as at least one audiovisual display 107 is present. One or more of the audiovisual display(s) 107 may be tilted to intermediate angles, e.g., downward facing at a 45-degree angle from the horizontal.

In certain embodiments, the audiovisual display(s) 107 can be housed outside the other media display client system components yet remain interfaced to the components via audio-video interface components, such as wired connectors, as described with respect to interface system 110. In some embodiments, audiovisual display(s) 107 are physically integrated with other computing system components as, for example, when an audiovisual display device 107 is part of a tablet device.

In some embodiments, one or more tablets (such as an iPad® or Android® device) may be utilized as audiovisual display unit(s) 107. In such embodiments, certain camera components may already be present on the standard tablet, pointing outward from the tablet display panel. A plurality of tablets might be synchronized or paired with one another to show the same media simultaneously and capture different outbound viewpoints from each of the audiovisual displays 107. The activity of the plurality of tablets might be coordinated by a tablet acting as the media display client system 120A that resides, for example, inside the mobile vehicle. Alternatively, one of the tablets (e.g., a "master tablet") may act as an audiovisual display 107, a camera component in the object sensor component array 106, and as the media display client system (e.g., 120, 120A-C) which coordinates the display of media on the other tablets acting as audiovisual displays. It should be noted that any combination of object sensor component locations described above, e.g., on the vehicle, in the vehicle, and on or inside the media display client apparatus, can comprise an object sensor component array. Further, camera components may be capable of more than one outbound viewpoint from a single mounting point.

Some embodiments of a media display client system may include a graphics processing system 108. A graphics processing system 108 may include, for example, a graphics processing unit (GPU) and the bus architecture (e.g., VESA, PCI) and or hardware driver software required to integrate the GPU into a computing system with a processing system and other components. The graphics processing system 108 may be used to process media for rendering on the audiovisual display unit(s) 107, as well as (in some cases) to interpret images and video captures from the camera components.

A communications interface may be used to provide communications between systems, for example over a wired or wireless network 140 (e.g., Ethernet, WiFi, a personal area network, a wired area network, an intranet, the Internet, Bluetooth, etc.). The communications interface may be composed of several components, such as networking cards or modules, wiring and connectors of various types, antennae, and the like. Synchronized tablets may communicate over a wireless network such as via Bluetooth, Wi-Fi, or cellular. Further information about communications interfaces may be found in regard to FIG. 11.

Other components of the media display client system, such as object sensor components 106 and a GPS 104, may be connected via other types of interfaces present in the interface system 110). These types of interface can adhere to categories such as parallel or serial (e.g., using interface standards such as USB, Firewire, etc.). In some embodiments (e.g., those represented in FIGS. 1B and 1C), the other interfaces may be of a more specialized type for connecting media display client system components together with components that are part of the vehicle system (e.g., 100B or 100C) of the mobile vehicle 99. Object sensor components (including camera components), GPS components, and audiovisual display units can be physically separate, but connected via the interface system, and still be part of same "system".

Network 140, connectivity to which is provided by the interface system 110, may be accessed by the media display client system 120A to interact with media management system/service 160, and client interface 130, as described in relation to FIG. 1.

FIG. 1B shows an example embodiment of a systems environment in which media display client system 120B leverages certain components that are part of the vehicle system 100B of the mobile vehicle 99.

In FIG. 1B, the media display client system 120B utilizes a GPS component 104 that is part of the vehicle system 100B. Object sensors in the object sensor component array 106 of the vehicle system 100B are also utilized in this example.

So that the vehicle system components may be leveraged, connectivity between the media display client system 120B and the vehicle system 100B are provided by a paired interface system 110, present on both 120B and 100B. Element 141 is indicative of the local pairing connection between the systems 120B and 100B. Connection 141 may be implemented over a network (e.g., wired, wireless, Bluetooth) using a communications interface as described previously. In some embodiments, the other interfaces may be of a more specialized type for connecting media display client system 120B components together with components (e.g., 104, 106) that are part of the vehicle system 100B of the mobile vehicle 99.

Specialized program instructions 102B on the computer readable storage media 101 of the media display client system 120B, when executed by processing system 103, perform these specialized operations for accessing and instructing vehicle system 100B components. In addition to these specialized program instructions, program instructions may also include those described in regard to various process flows of system 120B (e.g., in FIGS. 1 and 3-7) and/or those for controlling system components such as audiovisual display unit(s) 107, in conjunction with graphics processing system 108.

Network 140, connectivity to which is provided by the interface system 110, may be accessed by the media display client system 120B to interact with media management system/service 160, and client interface 130, as described in relation to FIG. 1.

In addition to object sensor and GPS components as described in FIG. 1B, certain types of vehicle systems have components that the mobile vehicle 99 uses for other functions, such as computing system components for processing object sensor data for vehicle control systems, providing user interfaces to drivers, and connecting with video display screens inside the vehicle (e.g., for passenger entertainments). FIG. 1C shows an example embodiment of a systems environment in which a simplified media display client apparatus 120C leverages several components that are part of the vehicle system 100C of the mobile vehicle 99.

In FIG. 1C, the media display client apparatus 120C, such as the apparatus depicted in FIG. 2, has audiovisual display unit(s) 107, and an interface system 110. The apparatus 120C utilizes a GPS component 104 that is part of the vehicle system 100C. Object sensors in the object sensor component array 106 of the vehicle system 100C are also utilized in this example. In addition, the graphics processing system 108, processing system 103, and computer-readable storage media 101 of the vehicle system 100C are leveraged by the media display client apparatus 120C.

Some mobile vehicle systems have the capability for users or manufacturers to upload custom programs onto the vehicle systems. For example, "apps" can, in some mobile vehicles, be installed via the vehicle's user interface panel, which may run a variation of a common operating system such as ANDROID. In this manner, specialized program instructions 102C may be installed on the computer readable storage media 101 of the vehicle system 100C. When executed by processing system 103 it may perform these specialized operations for accessing and instructing vehicle system 100C components in accordance with processes herein. In addition to these specialized program instructions, program instructions may also include those described in regard to various process flows described herein (e.g., in FIGS. 1 and 3-7) and/or those for controlling system components such as camera components and audiovisual display unit(s) 107 of the media display client apparatus 120C that are outside the vehicle system 100C.

Connectivity between components of the media display client apparatus 120C and the vehicle system 100C so that the vehicle system components may be leveraged are provided by a paired interface system 110, present on both 120C and 100C. Element 141 is indicative of the local pairing connection between the systems 120C and 100C. Connection 141 may be implemented over a network (e.g., wired, wireless, Bluetooth) using a communications interface as described previously. In some embodiments, the other interfaces may be of a more specialized type for connecting media display client apparatus 120C components (e.g., 107) together with the vehicle system 100C of the mobile vehicle 99.

Network 140, connectivity to which is provided by the interface system 110, may be accessed by the vehicle system 100C to interact with media management system/service 160, and client interface 130, as described in relation to FIG. 1. User interface features may be presented on the mobile vehicle's 99 user interface panel, which serves as a client interface 130, via an app to show the driver operator various metrics and provide control and configuration options.

In some embodiments of media display client system 120, including any example configuration in FIGS. 1A-1C, all or part of the processing system (e.g., 103), computer-readable storage media 101, and program instructions for a media session component (e.g., 102A, 102B, and 102C) may supported by a cloud computing arrangement, for example by being hosted by the media management system/service 160. In such embodiments, a remote computing system (e.g., consisting of a multiplicity of coordinating virtual cloud computing systems) may use their processing systems to execute certain program instructions, such as those implementing all or part of the media display client system process flows described in FIGS. 3-7. Connectivity to these cloud computing systems, which may be instances of computing systems as described in FIG. 11, may be provided by using the interface system 110 to connect with the media management system/service 160 over network 140.

Having described the overall component environment in which the disclosed techniques are carried out, the discussion turns to process flows for estimating the size and quality of audiences that view the digital media display sessions presented on media display client system/apparatus 120. FIGS. 3-7 show example process flows that may be executed in some embodiments of a media management system/service 160, or subcomponents thereof, e.g., audience estimation system 167 and session service 164.

Figure 3:
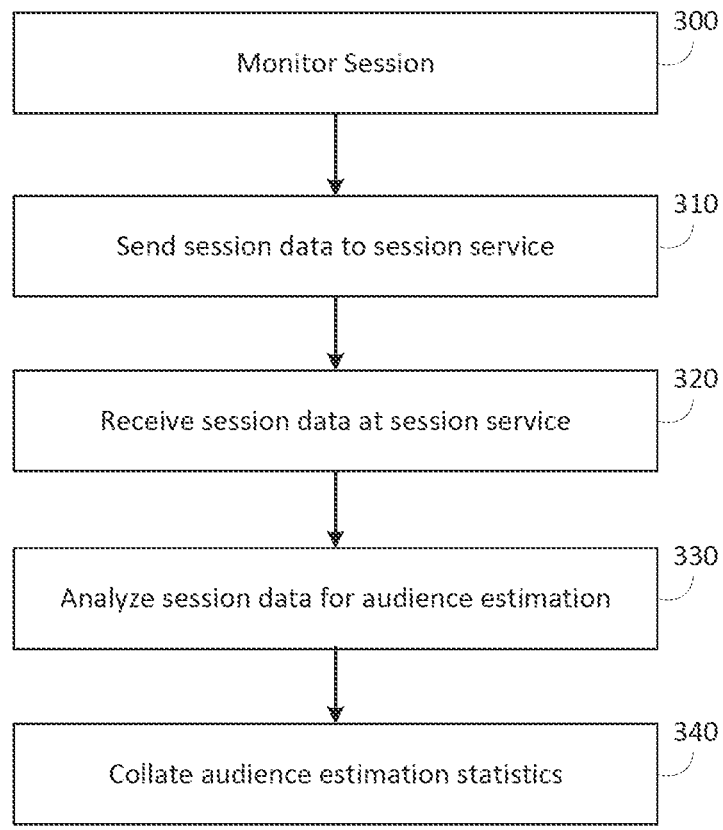
FIG. 3 shows an example process flow for the overall process of gathering, storing, and analyzing session monitoring data for collating audience estimation statistics.

FIG. 3 shows an example process flow for the overall process of gathering, storing, and analyzing session monitoring data for collating audience estimation statistics. In FIG. 3, a media display session is monitored (300) on the media display client system 120. During the display of the selected media on the audiovisual display unit(s), the periodically recurring process of gathering and storing session monitoring data recurs with a periodicity determined by the length of the monitoring time interval. Session monitoring data, broadly speaking, includes data gathered from media display client system sensor components that is relevant to audience estimation (e.g., the number of persons, viewing conditions of persons, and/or attention duration of persons who are proximate to the media display client system such that the selected media can be seen by them while being rendered on at least one audiovisual display unit). Session monitoring data includes a number of aspects further described below.

The "monitoring time interval" describes the amount of time that elapses between the repetition of processes that obtain and store data from media display client system components such as the GPS sensor and object sensor component array. A monitoring time interval may be any discrete and measurable time interval—measured, for example, in milliseconds, seconds, minutes, hours, or days. In some cases, the monitoring time interval is configurable, for example, by a default setting on the media management system/service, or for each media display client system via a user interface element. In some cases, the monitoring time interval may be self-configuring based on, for example, the nature or capabilities of the components of the media display client system, network quality, geolocation of the media display client system, time of day, or other properties.

Turning briefly away from FIG. 3, FIG. 4 shows an example sub-process flow for activities related to monitoring the media session, as indicated by the figure element "From 300". Processing the monitor session involves accessing sensors of various types. Object sensor(s), including camera components, in the object sensor component array are accessed (451), and GPS sensors of the GPS component are accessed (455). Accesses to obtain data from these sensor(s) may be performed by the system as serially executing steps or as steps executed in parallel processes/threads of the processing system or operating system. Accesses to object sensor(s), cameras, and GPS sensors may be performed, for example, by software on the media display client system that makes calls to operating system or hardware libraries/drivers via an API or other interface of the respective sensor type. The object sensor component array, camera components, and GPS component are described structurally and in various embodiments with regard to the FIGS. 1 and 1A-1C series.

Various kinds of data points relevant to audience estimation are collected during the accessing of the object sensor(s) via their respective APIs/interfaces. For example, the type, direction, speed, and proximity of objects near the mobile vehicle conveying the media display client system may be collected (452). Data points from different types and numbers of object sensor(s) may be combined in some embodiments to obtain the data points relevant to audience estimation.

Figure 5:
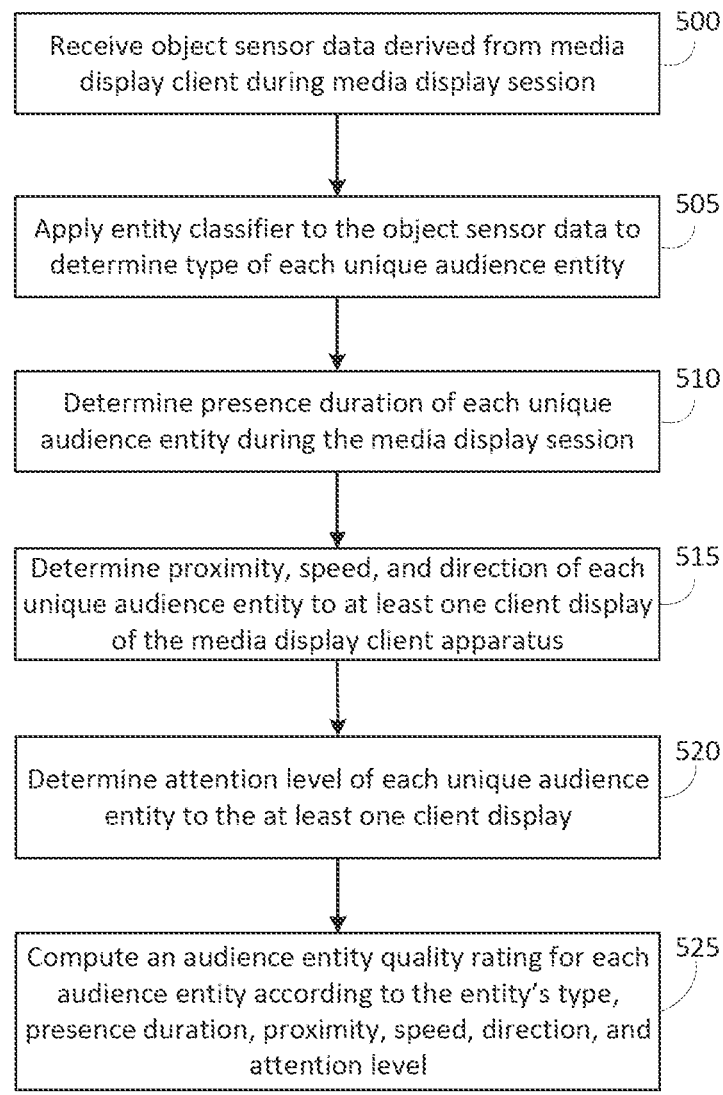
FIG. 5 shows an example process flow that describes in more detail the techniques and processes involved in audience estimation.
Figures 6, 7:
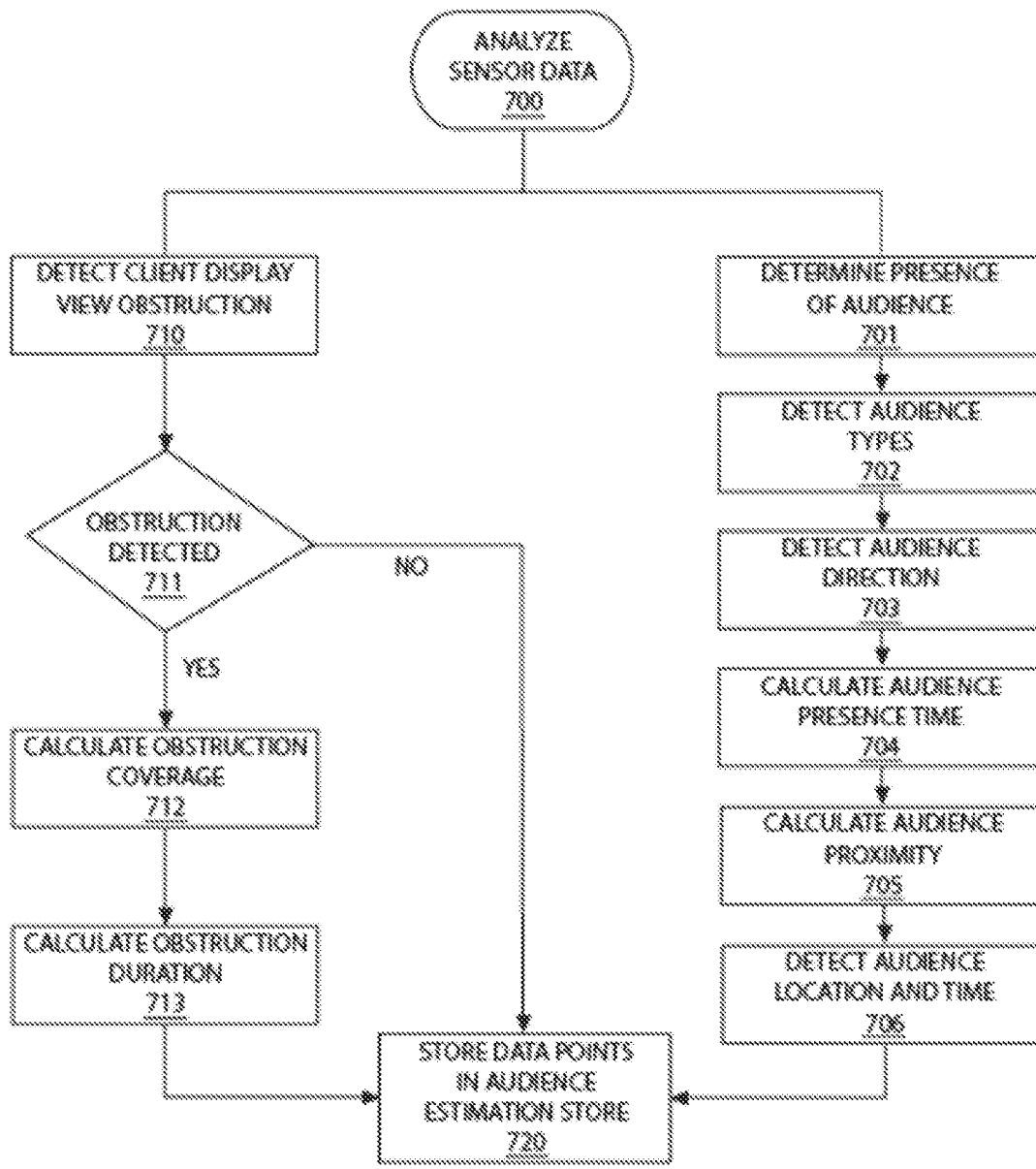
FIG. 6 shows an example process flow for detecting and assessing the impact of obstructions of the client display to audience estimation and audience quality.
FIG. 7 shows an alternative example process flow unifying aspects of various embodiments of the audience estimation processing techniques.

Techniques for using object sensor data and images and/or video captures in audience estimation are discussed in detail in relation to FIGS. 5-7. Briefly, however, LIDAR object sensor(s) can be used to accurately determine the distance of an object from the LIDAR sensor or, in some cases, its type. RADAR-type object sensor(s) can be used to determine the speed, distance, and/or direction of objects near the mobile vehicle conveying the media display client system. RADAR can also be used to determine the shape of objects in order to classify them by object type. Light sensor components may be used in some embodiments to determine the quantity of ambient light, or the duration and suddenness of changes in ambient light, and later analyzed during audience estimation. Audio-sensing components may be used to measure the level of sound noise, type of sounds, or the duration and suddenness of changes in sounds, and later analyzed during audience estimation to determine the types, proximity, duration, or other qualities of nearby audience entities. In some embodiments, images and/or video captures may be collected from the camera components (454). Images and/or video captures may be used to classify objects that are relevant to audience estimation and quality.

By accessing the GPS sensor(s) (455), updated time, updated date, updated location, updated speed, and updated direction data of the media display client system are obtained (456). Updated GPS data about the media display client system may be used in a variety of ways, including route calculation, tracking, and audience estimation.

In certain embodiments, time, date, and location data may be used to retrieve weather condition data in respect to the media display client system's current environment. Weather condition data may be obtained, for example, by using the communications interface of the media display client system to connect over a network with a weather data provider which provides weather condition data, e.g., via an API. Weather condition data may be used in some embodiments in audience estimation.

In some embodiments, a route map is generated and periodically updated (458) with the time, date, and location data. A route map may represent a consolidated view of the media display client system's activities over a period of time and be stored in lieu of or in addition to individual GPS sensor data points.

Having gathered and collected data points from object sensors and GPS sensors, the data points are stored in a session data package (459) pertaining to this particular media session. A "session data package" may be organized and stored on computer-readable storage media in any manner that can be readily understood by a processing system and/or software thereon, and conveyed via a network, e.g., to the session service 164 or audience estimation system 167 of a media management system/service (see FIG. 1). A session data package may be stored on computer-readable storage media accessible over a network, e.g., a cloud storage service. In some example embodiments, records or tables in a relational or No-SQL database may be used to store the session data package; in other embodiments, a data file with an XML or JSON format (or having a custom storage structure) can be used to organize the session data package.

In some embodiments, the session data package may store individual data points from individual sensors or sensor types. In other embodiments, the data points may be aggregated together to record a composite sensor state during a particular time slice. In some embodiments, for efficiency, data points may not be stored at all when they are not indicative of information relevant to audience estimation. Sometimes the data points may be processed into more summarized formations, e.g., for greater storage efficiency—as when individual GPS coordinates/data points are assembled into a route map and the route map is stored rather than the individual GPS sensor data points. Other information may also be included in the session data package to serve as contextual or identifying information, such as a media display client system id, a unique session id, start and stop times for the session or for each individual sensor reading, and other information without limitation.

From FIG. 4, processing element 310 transitions the process flow back to FIG. 3, in which the session data package is transmitted to the media management system/service 160 (or session service 164 thereof). The session data package is received (320) by the media management system/service over the communications interface. Reception of the session data includes the reception of object sensor monitoring data from the media display client system 120 to the audience estimation system 167. The session data package may have a media display client identifier or client id, a media package identifier or session id, a media purchaser identifier or purchaser id, and/or a media identifier, so that the session data package may be associated with the media package request that instigated the media session the session data package pertains to. The session data package may (or may not) be transmitted with the same physical or logical representation in which it is stored by the media management system/service 160. For instance, it may be transformed from the JSON representation in which it was sent to a relational structure when stored in the session store. For example, raw sensor data points may be processed into a more summarized structure for storage in the session store.

FIG. 9B shows an example representation of a session store 152, organized as a table in a relational database. In FIG. 9B, data properties are shown as attribute columns, with each non-header row denoting a media session of a media display client system and its data properties. Attribute columns may include, for example, a unique session id 910, client (e.g., media display client system) id 911, the referent to the original media id 900, media owner id 945, the session date 912, the session start time 913, the session stop time 914, the route map 915 (stored as a referent to a file), captured images/video 916 (stored as a referent to a compound file), and an estimate of the audience reach 917. Files may be stored in the file system with a referent (e.g., 915, 916) to the file name in the session store. An example record 920 is shown to represent a media session ("78301") associated with its exemplary data properties. This representation of a session store is exemplary only and not intended to be limiting.

Returning to FIG. 3, the session data, including the object sensor monitoring data, is analyzed for audience estimation (330). Such processing activities may be performed, for example, by the audience estimation system 167.

Figure 8A:
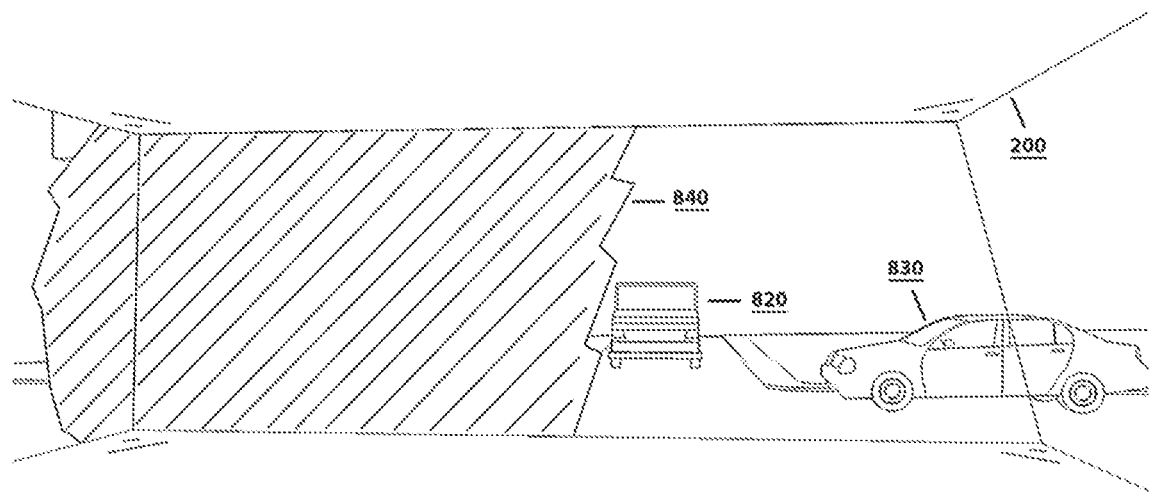
FIG. 8A shows an example outbound viewpoint from a media display client apparatus with an obstruction.
Figure 8B:
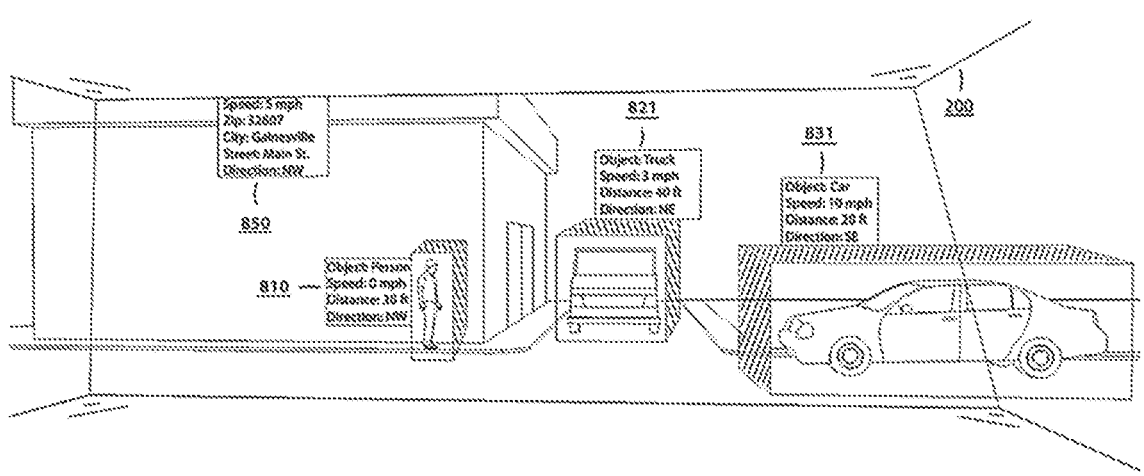
FIG. 8B shows an example diagram of the object sensor data points of several objects as shown from the outbound viewpoint of a media display client apparatus.

To illustrate certain concepts further before turning to detailed analytical techniques, FIG. 8B shows an example diagram of the object sensor data points of several objects as shown from the outbound viewpoint of a media display client apparatus 200. The figure shows several objects detectable using object sensor(s) and cameras. A pedestrian 810 has been detected, being determined by the media display client system as a "person, 30 feet away, heading northwest at speed of 0 miles per hour." A vehicle 821 has been detected, determined by the media display client system as a "truck, 40 feet away, heading northeast at a speed of 3 miles per hour." Another vehicle 831 has been detected, determined by the media display client system as a "car, 20 feet away, heading southeast at a speed of 10 miles per hour." Also indicated are the location, speed, and direction data 850 of the mobile vehicle conveying the media display client apparatus 200, as obtained from GPS sensor(s), shown to be "at Main St., zip code 32607, city of Gainesville, heading northwest at a speed of 5 miles per hour." Any of the entities 810, 821, or 831 are potential audience entities.

FIG. 5 shows an example process flow that describes in more detail the techniques and processes involved in analyzing object sensor data for audience estimation. Such processes may be performed in some cases by an audience estimation system 167 subcomponent of the media management system/service 160.

In FIG. 5, object sensor data, derived from the media display client during a media display session, is received (500).

An entity classifier is applied to the object sensor data to determine the type of each unique audience entity (505). An "audience entity" may be any pedestrian, cyclist, automobile, truck, van, motorcycle, bus, or other vehicle that conveys at least one human person who might view a digital media session being shown on a display of the media display client apparatus. The entity classifier determines, as a threshold, the existence of at least one audience entity from object sensor data and, if at least one is found, categorizes each unique audience entity by its entity type. An audience entity's type may impact both the techniques applied in determining further properties of the audience entity and its entity quality rating.

Object sensor data from various types of object sensors can be used to determine the existence and type of audience entities present during a media session. An entity classifier may utilize, for example, visual data obtained from camera or video feeds, as well as RADAR and/or LIDAR data from media display client apparatus sensors or sensors onboard the mobile vehicle. Data from audio sensors may also be used in some instances by the entity classifier. It should be noted that object sensor data from multiple types of object sensors can processed by the entity classifier.

Indeed, some classification activities of the entity classifier may occur iteratively, and every analysis technique utilized by the entity classifier is not necessarily applied on each iteration. For example, a first iteration (or "pass") may utilize certain techniques to roughly categorize or eliminate objects of interest as audience entities. Later, more granular, passes may then be performed that utilize additional techniques to further distinguish audience types or other properties of the unique audience entity.

For instance, in some cases, determining the type of each unique audience entity includes the classification or determination of non-audience entities and separating them from the entities that may be relevant audience types. For example, an entity classifier may use image-type object sensor data in a first sorting operation to distinguish between buildings and trucks, or between trees and people, or between pets and children.

Now, the discussion delves more deeply into various object sensor types and how their data might be processed to determine an audience entity's existence and type. As noted, in some embodiments, images and/or video captures may be collected from the camera components. Images and/or video captures may be used to classify objects that are relevant to audience estimation. Importantly, it should be noted that many of the techniques of image and/or video analysis may be applied during process flow activity pertaining not only to the entity classifier, but also to attention level determination, presence duration determination, and other aspects.

One kind of analysis involves facial or object recognition in images, wherein automated methods are used to classify one or more aspects of the subject matter of an image. Classification of object types by image or video data can be performed, for example, by using a trained machine learning model, or a combination of models, trained to classify target object types (e.g., pedestrians, automobiles, motorcycles, bicycles, trucks, etc.) to infer the presence of these objects in the images or videos collected by the camera components. Images and video captures may be analyzed to perform face detection within the images or videos, indicating the presence of an audience member within viewing range of the selected media and the duration of the viewership. For example, anonymous video analytic (AVA) software allows counting of faces without violating the privacy of persons in the image or determining the identity of particular persons.

Certain instantiations of an entity classifier may enhance image analysis in various ways using one or more kinds of machine learning-based image interpretation services. Different kinds of image interpretation services may be provided by a third-party service provider such as Microsoft Azure®, Amazon® Web Services, or Google®, for example via an API of the image interpretation service. These services can accept an image from a calling application (e.g., the audience estimation system 167) and return the predominant found objects in the result.

In some cases, techniques can be used to train custom image classifiers that with content that are used to find similar image content among images from object sensor data. Implementations herein can place canonical training images of people and various types of vehicles (e.g., of a person in various body positions, such as sitting, walking, etc., or of automobiles, trucks, and bicycles, buses and other vehicles from various perspectives) that have been pre-tagged into a repository of images to build a custom classifier image training set.

Some third parties, such as the Microsoft Custom Vision Service, may provide custom image classifier capability as a service accessible via an API. A custom image classifier service, via its API, is then directed to train itself to recognize similar subject matter in other images. The trained custom image classifier is then used as one instance of a classification module that can be queried by the entity classifier, directing the trained image classifier to review object sensor data from a media session and return those images that have the same conceptual identity as defined by the custom image classifier.

In some implementations, an entity classifier may use an image interpretation services that is able to identify the subject matter of content in images without a custom image classifier. Third parties, such as the Microsoft Computer Vision API, may provide such capabilities as a service accessible via an API. Analysis of image content may be performed by sending an image from the object sensor data, via the service API, for content classification. Image subject matter characteristics on various levels of granularity are extracted from the visual content of the image and returned along with confidence levels indicating the service's confidence in a match. For instance, if a photo of a person sitting under a tree petting a dog is submitted to the Microsoft Computer Vision API, it returns "a person petting a dog" as the image caption (0.497 confidence), along with the concepts "person" (0.996 confidence), "outdoors" (0.995 confidence), and "petting" (0.619 confidence). The gender and age of faces in the photo are also returned (e.g., "male, age 31"). These subject matter concepts present in the image, along with their confidence score, may be used to identify and assess audience entity types, attention levels, or other aspects relevant to audience estimation.

Full motion video may be available as object sensor data in some implementations. Sometimes, full motion video may be segmented into still frames extracted or sampled at a specific rate (e.g., one frame every 10 ms). Those still frames may then be analyzed using still image techniques, as described previously.

Moreover, in some implementations, techniques may be used that enable the analysis of full motion video data in its native format. For example, video analysis services may be used to perform useful analysis and classification functions. Some implementations may interact with a service that can detect and track faces in video, such as the Microsoft Video API. For instance, a video is submitted to the service via the API, which returns an enumeration of distinct faces along with their timing coordinates and their location/size dimensions on the two-dimensional plane of the video. This returned enumeration of distinct faces can be used to count and uniquely identify each audience entity of interest. Furthermore, still images of each distinct face (which may include one or more samples taken from different time coordinates) can then be extracted from the video and used to identify the faces for use in other techniques previously described (e.g., facial recognition, custom image classifier training, etc.). Also, a selection of video content where the audience entities are present can then be extracted from the larger video item and then analyzed further for other aspects, such as attention level.

These techniques might be used in one or more analysis passes by the entity classifier to reduce a video record of a media session to only that relevant content containing actual audience entities. The reduction to relevant content may then be used to correlate times where audience entities were present to relevant time ranges in other types of collected object sensor data. For example, the time range of presence of a unique audience entity can be determined from the analyzed video, and then associated with LIDAR data during the same time range to perform additional analysis.

LIDAR object sensor data can be used by the entity classifier in some embodiments to detect the presence and type of objects in proximity to the media display client apparatus. Such LIDAR data analysis can be used in various ways indicative of an audience entity, e.g., to sense moving entities against immobile background structures or to separate likely uninteresting structures, such as buildings, from smaller structures or objects, such as pedestrians or cars. Segmentation of objects from raw LIDAR data can be performed, in its simplest aspect, by analyzing the 2D LIDAR data using L-shapes or bounding boxes and verifying them against simple rules. Additional LIDAR-data techniques may be used to obtain 3D data points from the LIDAR sensor and segment them into candidate object type classes or audience entity type classes separate from the background field.

RADAR object sensor data may be analyzed to determine the presence of and shape of objects and potential audience entities in order to classify them by object type. Classification of object types by radar data can be performed, for example, by comparing the known radar signatures of target object types (e.g., pedestrians, automobiles, motorcycles, bicycles, trucks, etc.) to the radar data signature from the object sensor(s). Machine learning models, including neural networks, may be trained (e.g., with supervised learning) with RADAR object signatures from known target audience types. These models and/or networks are executed during entity classification with the RADAR data from the current media session to yield or assist in the classification of categories of audience entity types.

Audio sensor data from audio-sensing components may be used in some embodiments. In some cases, detection and classification of object types by audio data can be performed, for example, by comparing the known audio signatures of target object types (e.g., pedestrians, automobiles, motorcycles, bicycles, trucks, etc.) to the audio data signature from the audio-type object sensor(s). Machine learning models, including neural networks, may be trained (e.g., with supervised learning) with audio data depicting sounds made from known target audience types. These models and/or networks are executed during entity classification with the audio data from the current media session to yield or assist in the classification of categories of audience entity types.

Yielded from the stages of analysis performed by the entity classifier on the various types of object sensor data is a set of unique audience entities present during a media display session. Also yielded is additional information associated with each unique audience entity, such as its "type" (e.g. person, pedestrian, car, truck, bus, motorcycle, cyclist), and, in some cases, time range data to be used for further analysis by additional components or techniques of the audience estimation system.

The presence duration of each unique audience entity during the media display session is determined (510). Several techniques may be used independently or combined in accordance with the nature of available object sensor data in order to determine the presence duration of a unique audience entity.

For example, object sensor(s) can be configured to log important sensing events with timestamps (e.g., in millisecond increments). When audience entities are identified during entity classification, the timestamps can be used to very precisely determine the amount of time a given audience entity was being perceived by the object sensor.

In embodiments where video analysis is being used, presence duration for each unique audience entity can be determined from the selection of video content where the audience entities are present (see video analysis discussion, above) by computing the amount of time each unique audience entity is present in the video selection.

In embodiments where object sensor data containing still images is available, the presence duration of the audience entity can be gleaned by taking the delta of the timestamp of the still image where the audience entity first appeared from the timestamp of the subsequent still image where the audience entity first disappeared.

In some implementations, presence duration may be determined by correlating GPS time data available from the media display client system/apparatus GPS sensors with events of interest in the object sensor data.

The proximity, speed, and direction of each unique audience entity to at least one client display is determined (515). Each unique audience entity identified by the entity classifier is associated with a unique time period during which the entity was present. This unique time period can be correlated with data from other object sensor(s) to determine speed, distance, and direction of the unique audience entity from the audiovisual display(s) of the media display client apparatus during the media session.

In embodiments where RADAR-type object sensor(s) are used, RADAR object sensor data are known to be capable of providing the speed, distance, and/or direction of objects near the mobile vehicle conveying the media display client system. Correlating the RADAR data with the unique time period (or signature) of the unique audience entity of interest yields the speed, distance, and direction of the unique audience entity relative to the media display client apparatus.

In embodiments where LIDAR object sensor(s) are available, LIDAR object sensor data can be used to very accurately determine the distance and direction of an object from the LIDAR sensor. Correlating the LIDAR data with the unique time period (or signature) of the unique audience entity of interest yields the distance, and direction of the unique audience entity relative to the media display client apparatus.

In embodiments where audio-type object sensors are available, the level of sound noise and the directionality of sound can be determined from audio sensor data and analyzed to approximately determine the distance and direction of a correlated unique audience entity. In some cases, the duration and suddenness of changes in sounds yielded from audio sensors can be used to compute a doppler shift which serves as an approximation of the speed of the audience entity of interest, relative to the motion of the mobile vehicle on which the media display client is conveyed.

Speed and direction data from GPS sensor(s) may be used in some embodiments, for instance, by calculating the delta of the vector of the speed and direction of the media display client system with respect to the vectors of audience entities detected by the object sensor(s) and/or cameras. For example, an occupant of a vehicle moving at a high velocity in the opposite direction from the mobile vehicle conveying the media display client system may have less viewing time (and hence less audience value) than a vehicle moving at a similar velocity in the same direction as the mobile vehicle.

In embodiments in which object sensor data includes full motion video, video analysis techniques may be used to determine the speed of an identified unique audience entity. By knowing the camera's frame capture rate (e.g., 10 per second) and counting the number of frames it takes for a unique audience entity to move a fixed distance (for example, the known length of a particular camera's field of view at a particular magnification or lens setting), the speed of the audience entity can be calculated.

The attention level of each unique audience entity to the at least one client display is determined (520). Aspects of the attention level include determining whether the audience entity's "face" is turned toward the media display client system 120. If an audience entity is faced toward the media display client system, it is more likely that the attention level is higher than if the audience entity is faced away from it. The direction the audience entity is facing can be detected, in some embodiments, using facial detection or recognition software.

In some cases, vehicle component recognition may be used to assist in the determination of attention level of moving vehicle-type audience entities. Trained machine learning models or classifiers can be trained to recognize the component features of vehicles that contain passengers, such as the front grille or hood, the rear trunk with license plate holder, or side windows and mirrors. The directionality of those vehicle components relative to the known direction of travel of the mobile vehicle conveying the media display client could indicate the direction the audience entity is facing in respect to the media display client's audiovisual displays. For example, an vehicle-type audience entity that was recognized using a vehicle component recognition model to have its front grille facing the rear camera, could be assumed to be traveling behind the media display client. This would yield a higher attention level than an audience entity passing quickly by the side.

In some situations, it may be possible to enumerate and classify the audience entities inside a vehicle by their recognized facial positions relative to vehicle component placement. For example, a vehicle may be assumed to have one driver with relatively high attention, but there may be additional audience entities traveling in the same vehicle with relatively higher or lower attention levels, such as a passenger in the front seat or back seat of the vehicle.

Included as an aspect of the attention level is the attention duration. For example, the length of time an audience entity is turned toward an audiovisual display may be factored into the attention level and serve to increase or decrease the overall attention level factor.

An audience entity quality rating for each unique audience entity is computed according to the entity's type, presence duration, proximity, speed, direction, and attention level (525). Each of the analytical factors determined thus far may contribute create an "audience entity quality rating," which is a score which is used to describe the difference between highly engaged audience viewership and moderate or low audience engagement.

For instance, the proximity of the audience entity to the media display client affects the quality rating because audience entities at greater distances are less able to see the media session and thus are less engaged with the media. The duration of presence of the audience entity increases the quality rating because the longer the audience entity can see the media session, greater the engagement. The speed of the audience entity relative to the media display client's conveying vehicle would impact the quality rating in that higher relative speeds would not only decrease duration presence, it would equate to less time for attention to the media versus handling the vehicle being driven. The direction of the audience entity from the media display client would impact the quality rating because audience entities at certain directions would have lower quality ratings than others. For example, audience entities traveling behind a media display client will be looking forward generally at all times toward the audiovisual displays, whereas audience entities on either side would be less engaged due to having to look to the side, whereas audience entities in front would only observe the media session when looking in the rear view mirror. Audience entities at oblique angles to the audiovisual displays may not have visibility of the audiovisual displays at all.

The "type" of audience entity, which may include not only general classifications such as pedestrian, passenger, or automobile but also finer classifications such as gender and age or type of automobile, may impact the quality rating in several ways. For example, an adult aged 30-50 may be more valued for quality than a small child, due either to the possibility of certain types of media being more engaging for certain age groups, or because certain age groups have more capacity for engagement generally. If a media session contains content pertinent to commercial truck drivers, then audience entity type "commercial truck" may be rated with higher quality.

Finally, the attention level of a unique audience entity impacts the audience entity quality rating. Audience entities "facing" an audiovisual display are inherently more engaged than those facing away from it. However, in implementations and media sessions that include an audio track, audience entities not "facing" an audiovisual display may also be engaged if they are in sufficient proximity to hear the media session. Thus, the audience entity quality rating is understood to be a balance of factors and characteristics.

Depending on their nature (e.g., numerical vs. categorical), each of these individual factors contribute to the overall audience entity quality rating in different ways. Thus, these factors may be weighted in terms of their overall contribution to the quality rating. The quality rating itself may be a continuous (e.g., numerical) or categorical (e.g., "low", "medium", "high") value.

In some embodiments, a multi-layer machine learning model may be constructed to take individual factors for each audience entity and output a quality rating which is correlated to high engagement outcome metrics (such as high conversion rates to sales or donations, or "likes" in social media).

Obstructions of the media display client apparatus's audiovisual displays may prevent potential audience entities from viewing the displayed media session. Thus, obstructions may impact audience estimation metrics and audience quality ratings. To illustrate, FIG. 8A shows an example outbound viewpoint from the inside of the protective enclosure of a media display client apparatus 200. In the outbound viewpoint, an obstruction 840 (e.g., representing debris such as a newspaper or snow) of the view through the transparent panel is shown as a shaded area. Also depicted are a truck 820 and automobile 830, which may be notable objects relevant to audience estimation.

FIG. 6 shows an example process flow for detecting and assessing the impact of obstructions of the client display to the audience estimation. These techniques may be implemented in some, but not necessarily all, embodiments.

Potential view obstructions of the client displays are detected from the object sensor data and the obstruction duration and obstruction coverage are determined (600). Recognition of potential view obstructions may be possible using object sensor data of several types.

In some embodiments, images and/or video captures taken from the camera components are analyzed to determine the extent to which the selected media being rendered on the audiovisual display units is visible to audiences. The image or video captures may be used to monitor for the presence of obstructions which might impact an audience's viewing of the selected media, e.g., a truck passing on the right side of the mobile vehicle might block the visibility of the right-side audiovisual display unit(s) to pedestrians; a street sign, hill, highway barrier wall, parked automobiles, trees, bushes/foliage, the walls of buildings or yards, and other landscape features might block the viewing of one or more audiovisual display units.

In some examples or embodiments, image or video captures may be used to determine the presence of lighting or environmental obfuscation factors impacting the audience's viewing ability. For example, bright sun (or a bright moon), headlights, or other strong lighting may impact viewability; the presence of dust, snow, rain, fog, frost, dew or surface moisture, leaves, or other debris that block the audiovisual display unit(s) might be detected by the camera components facing outward from the media display client system/apparatus.

A machine learning model may be used to recognize pertinent obstructions. Techniques for training a machine learning model to recognize salient characteristics of still images and moving video were discussed in detail in regard to processing element 505, and such techniques are applicable here to train a machine learning model to recognize various types of obstructions and their obstruction coverage levels.

Light sensor data from light-sensor components may be used in some embodiments. For example, the quantity of ambient light, or the duration and suddenness of changes in ambient light, might be collected from light sensors and analyzed to determine whether obstructions are blocking the audiovisual display units or whether environmental lighting or lighting from other vehicles might make the media session difficult to see.

Timestamps associated with the object sensor data indicating obstruction of an audiovisual display can then be analyzed for their duration and whether the obstruction's presence coincides with any concurrently present audience entities.

Given the existence, type, duration, and coverage of an obstruction of an audiovisual display unit of the media display apparatus, one or more audience entity quality ratings can be adjusted (610). For example, the audience entity that was present during any time period when an obstruction or diminished view of the audiovisual display occurred may have its audience entity quality rating reduced proportionally to the duration and coverage, in consideration of the type of obstruction. In cases where the type of obstruction is one related to diminished overall visibility (e.g., rain or fog), the quality rating may be impacted differently than when the display is explicitly obscured, such as with newspaper debris.

FIG. 7 shows an example process flow unifying aspects of various embodiments of the audience estimation processing. Some of the detailed concepts have been discussed previously in regard to FIGS. 5-6.

The overall process flow, analyze sensor data (700), starts with the audience estimation system 167 processing the object sensor data obtained from the session data package, including video and/or images obtained during the media session. Multiple parallel analysis paths may occur simultaneously; here, two paths are depicted, one for determining audience entities and their characteristics (beginning with 701), and another for detecting media client audiovisual display view obstruction (beginning with 710).

Taking the first path for determining audience entities, the processing element detect presence of audience (701), uses the audience estimation system 167 to scan the object data collected from the object sensor array for the presence of an audience entity. When unique audience entities are detected, techniques are applied to determine their audience types (702), i.e., to uniquely identify each individual audience detected by the previous step and label it as a type such as a person, a pedestrian, a car, a truck, a vehicle, a motorcycle, a cyclist, and so on. These steps may be accomplished, for example, by machine learning models that are trained to determine from the available object sensor data, including video/images and identify various audience types. The detailed variety of possible methods used for performing presence detection and audience entity classification are discussed above in regard to element 505 of FIG. 5.

The next processing element, detect audience entity direction (703), includes determining speed and direction of the unique audience entity, as well as identifying if the audience entity is facing towards the media display client system 120. For example, the audience direction can be detected via facial detection or vehicle component recognition. Techniques involved in processing element 703 are discussed above in regard to elements 515 and 520 of FIG. 5. Calculate audience presence time (704), includes obtaining the initial time in which each individual audience entity was detected and obtaining the final time in which each individual audience entity was detected. Various methods for determining presence duration were discussed in regard to element 510 of FIG. 5. Calculate audience proximity (705), includes processing the distance at which each individual audience entity was detected, methods for which were discussed in regard to element 515 of FIG. 5.

Detect audience location and time (706) includes obtaining the GPS location coordinates, street name, or general area, as well as the time of day in which each audience type was detected. Such information may be useful to those who commission media sessions for display in order to target which times and locations in which they wish to display future media sessions. The final element, store data points in audience estimation store (720), includes saving of the audience estimation data collected from the analysis of the object sensor data to the audience estimation store 155. This process flow is not meant to limit the possibilities of what types of audience statistics can be identified through an artificial intelligence system, but rather to detail important audience statistics that can factor into the audience estimation algorithm as well as provide users with useful data for future media display sessions. It should be noted that the analysis data points can be sent directly to a data store without updating the media session package. It should also be noted that the detailed object sensor data that are being analyzed do not have to be stored other than temporarily. The analytical tools can be applied, for example, by a trained machine learning model that can analyze the raw data and then store its analysis results in the data store, disposing of the raw data to reduce storage needs and increase audience entity privacy. It should also be noted that such analytical processing can take place on the media display client system, when instantiated in device/component arrangements with sufficient processing power.

The second pathway of FIG. 7, pertaining to obstruction analysis, starts with detecting a view obstruction of the client display (710). Techniques for detecting a view obstruction are discussed in regard to element 600 of FIG. 6. If an obstruction is not detected (711), the lack of an obstruction is stored in the audience estimation store (720). If an obstruction is detected (711), the obstruction coverage over the media client display screen is calculated (712) by estimating size of the field of the view being blocked and representing it as a percentage. As noted in FIG. 6, the quality rating of audience entities present during this period can be degraded due to the likeliness of the media session not being viewable on the displays. The obstruction duration is calculated (713), for example using the start time in which the obstruction was initially detected and the end time in which the obstruction was no longer detected, and totaling the full duration in which the obstruction occurred (see also FIG. 6). Finally, relevant obstruction-related data points (e.g., obstruction presence, type, coverage, and duration) are stored in the audience estimation store 155.

Returning now to FIG. 3, the example summarized process flow, the audience estimation statistics are collated (340). During collation of audience estimation statistics, the individual audience entity quality ratings may be ranked or categorized. The quality ratings may summed and/or analyzed for optimal time of day, optimal audience entity type, or other optimization metrics that can be used to update the media session package with additional useful information viewable by users in the web portal 169 (see, e.g., FIG. 10 and related discussion). In some cases, each individual audience quality rank is combined to derive an audience estimate range that users can view in the history screen in FIG. 10. In some cases, peak viewership locations and times can be totalized, with maps having location pins and highlight the times during which most audience viewership was obtained from the media display session. This data, which can be viewed in the history screen in FIG. 10, is useful for users interested on how much audience reach was obtained from the media display session.

FIG. 9A shows an example representation of an audience estimation store 155, organized as a table in a relational database. In FIG. 9A, data properties are shown as attribute columns, with each non-header row denoting a media session's audience estimation statistic captured from a media display client system 120 and its data properties. Attribute columns may include, for example, a session id 910, an audience type 931 (pedestrian, truck, car, bus, cyclist, motorcycle), audience detection time 932 (the time at which the audience type was detected), audience proximity 933 (the distance or average distance at which the audience was detected from the media display client system 120), audience location 934 (the GPS coordinates, street name, or general area at which the audience was detected), audience direction 935 (the direction in which the audience was heading to indicate whether or not the audience was facing the media client display system), audience detection duration 936 (the total amount of time the individual audience type was detected), audience viewership rank 937 (the audience entity quality rating based on quality and engagement of audience viewership that is derived during analysis), obstruction 938 (a Boolean value that indicates if a viewing obstruction was detected on the media display client system 120 that is determined from models assessing visual obstruction patterns), obstruction coverage 939 (a media client display system obstruction coverage percentage), and obstruction detection time 940 (the total time in which the obstruction was detected). A group of example records 930 and their exemplary data properties are shown to represent audience estimation statistics from a single media session ("78301"). This representation of an audience estimation store 155 is exemplary only and not intended to be limiting in terms of the type, quantity, or structure of the data store.

FIG. 9C shows an example representation of a user data store 153, organized as a table in a relational database. In FIG. 9C, data properties are shown as attribute columns, with each non-header row denoting a user of a media display client system 120 and associated data properties. Attribute columns may include, for example, a unique client id 911, vehicle type 921, status 922, and uptime 923 (the media display client system's 120 current operational running time). An example record 925 is shown to represent a client id ("335") associated with its exemplary data properties. This representation of a session store is exemplary only and not intended to be limiting in terms of the type, quantity, or structure of the data store.

Figure 10:
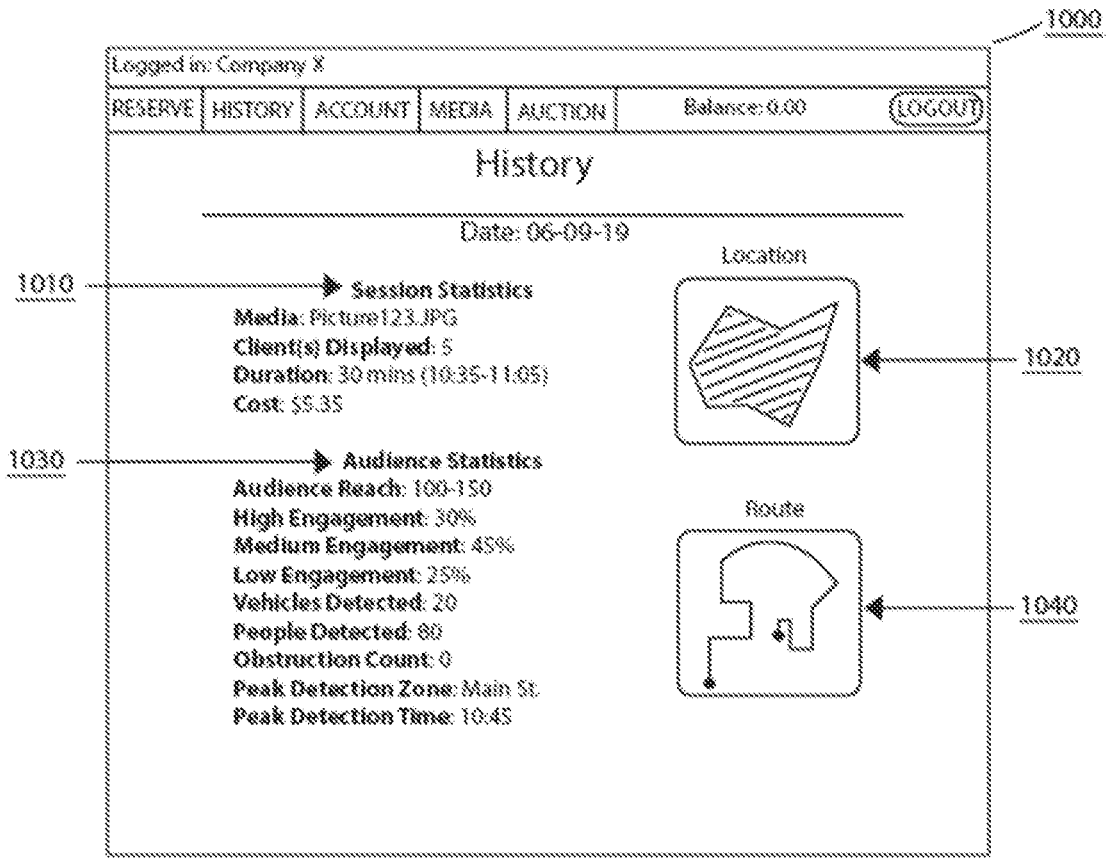
FIG. 10 shows an example interface with user interface elements so that a user-operator can monitor the audience estimation statistics and status of a digital media session.

FIG. 10 shows an example user history screen detailing history statistics from previous media display sessions. User history screens may be presented via a user web portal 169 as described in FIG. 1. In some embodiments, data about the media display client system 120, its history, and its user-operator account and contact data may be stored on the media management system/service in a user data store 153, a session store 152, and an audience estimation store 155, as described in regard to FIG. 1.

The example user interface 1000 showing "History" information in FIG. 10 displays useful information to any user that is interested in the amount of audience reached and other notable media display client system 120 and audience statistics. The session statistics section 1010 details information such as the media that was displayed during the session, the total number of media display client system(s) 120 on which the media was displayed, and the total duration of time in which the media was displayed on all media display client system(s) 120. The location map 1020 details information on the location in which the media display session occurred. The audience statistics section 1030 details information about the audience detected during the media display session. This information includes the total estimated audience reach, the percentage of high audience engagement levels, the percentage of medium audience engagement levels, the percentage of low audience engagement levels, the total number of vehicles detected, the total number of people detected, the total number of obstruction events that occurred on the media display client system 120, the areas/zones in which most audience members were detected, and the time in which most audience members were detected. The route map 1040 details the full path in which the media display client system 120 traveled along during the media display session. This representation of a history screen is exemplary only and not intended to be limiting in terms of the type, quantity, or structure of the data, or the type of visual elements displayed.

FIG. 11 shows a block diagram illustrating components of a computing device or system used in some embodiments of techniques, systems, and apparatuses for facilitating sensor-based audience estimation in relation to digital media display management. Any component utilizing a computing system or device herein, including a media management system/service, media display client system 120, media display client apparatus, client interface, vehicle system, or any other device or system herein may be implemented on one or more systems as described with respect to system 1300.

System 1300 can be used to implement myriad computing devices, including but not limited to a personal computer, a tablet computer, a reader, a mobile device, a personal digital assistant, a wearable computer, a smartphone, a laptop computer (notebook or netbook), a gaming device or console, a desktop computer, or a smart television. Accordingly, more or fewer elements described with respect to system 1300 may be incorporated to implement a particular computing device. System 1300 can itself include one or more computing systems or devices or be distributed across multiple computing devices or sub-systems that cooperate in executing program instructions. The hardware can be configured according to any suitable computer architectures such as a Symmetric Multi-Processing (SMP) architecture or a Non-Uniform Memory Access (NUMA) architecture.

The system 1300 can include a processing system 1301, which may include a processor or processing device such as a central processing unit (CPU) or microprocessor and other circuitry that retrieves and executes software 1302 from storage system 1303. Processing system 1301 may be implemented within a single processing device but may also be distributed across multiple processing devices or sub-systems that cooperate in executing program instructions.

Examples of processing system 1301 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general-purpose CPU.

Storage system 1303 may comprise any computer-readable storage media readable by processing system 1301. Storage system 1303 may include volatile and nonvolatile, removable and nonremovable media implemented in any method or technology for storage of information, such as computer readable instructions, data structures, program modules, or other data. Examples of storage media include random access memory (RAM), read only memory (ROM), magnetic disks, optical disks, write-once-read-many disks, CDs, DVDs, flash memory, solid state memory, phase change memory, 3D-XPoint memory, or any other suitable storage media. Certain implementations may involve either or both virtual memory and non-virtual memory. In no case do storage media consist of a transitory propagated signal. In addition to storage media, in some implementations, storage system 1303 may also include communication media over which software 1302 may be communicated internally or externally. Storage system 1303 may be implemented as a single storage device but may also be implemented across multiple storage devices or sub-systems co-located or distributed relative to each other. Storage system 1303 may include additional elements capable of communicating with processing system 1301.

Storage system 1303 is capable of storing software 1302 including, e.g., program instructions 1304. Software 1302 may be implemented in program instructions and, among other functions, may, when executed by system 1300 in general or processing system 1301 in particular, direct system 1300 or processing system 1301 to operate as described herein. Software 1302 may provide program instructions 1304 that implement components for sensor-based audience estimation in relation to digital media display management, including but not limited to analyzing object sensor data to perform audience estimation, rendering media, interacting with vehicle systems, controlling the object sensor component array, the GPS component, or performing any other processing operation described herein. Software 1302 may implement on system 1300 components, programs, agents, or layers that implement in machine-readable processing instructions 1304 the methods and techniques described herein.

Application programs 1310, OS 1315 and other software may be loaded into and stored in the storage system 1303. Device operating systems 1315 generally control and coordinate the functions of the various components in the computing device, providing an easier way for applications to connect with lower level interfaces like the networking interface. Non-limiting examples of operating systems include Windows® from Microsoft Corp., IOS™ from Apple, Inc., Android® OS from Google, Inc., Windows® RT from Microsoft, and different types of the Linux OS, such as Ubuntu® from Canonical or the Raspberry Pi OS. It should be noted that the OS 1315 may be implemented both natively on the computing device and on software virtualization layers running atop the native Device OS. Virtualized OS layers, while not depicted in this Figure, can be thought of as additional, nested groupings within the OS 1315 space, each containing an OS, application programs, and APIs.

In general, software 1302 may, when loaded into processing system 1301 and executed, transform system 1300 overall from a general-purpose computing system into a special-purpose computing system customized to facilitate sensor-based audience estimation in relation to digital media display management, rendering media, interacting with vehicle systems, controlling the object sensor component array, the GPS component, or performing any other processing operation as described in various devices, systems, apparatuses, and services herein. Indeed, encoding software 1302 on storage system 1303 may transform the physical structure of storage system 1303. The specific transformation of the physical structure may depend on various factors in different implementations of this description. Examples of such factors may include, but are not limited to, the technology used to implement the storage media of storage system 1303 and whether the computer-storage media are characterized as primary or secondary storage. Software 1302 may include software-as-a-service (SaaS) loaded on-demand from a cloud service. Software 1302 may also include firmware or some other form of machine-readable processing instructions executable by processing system 1301. Software 1302 may also include additional processes, programs, or components, such as operating system software and other application software.

System 1300 may represent any computing system on which software 1302 may be staged and from where software 1302 may be distributed, transported, downloaded, or otherwise provided to yet another computing system for deployment and execution, or yet additional distribution. System 1300 may also represent other computing systems that may form a necessary or optional part of an operating environment for the disclosed techniques and systems.

An interface system 1320 may be included, providing interfaces or connections to other computing systems, devices, or components. Examples include a communications interface 1305 and an audio-video interface 1321, which may be used to interface with components as described herein. Other types of interface (not shown) may be included, such as power interfaces.

A communications interface 1305 provides communication connections and devices that allow for communication between system 1300 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here. Transmissions to and from the communications interface may be controlled by the OS 1315, which informs applications and APIs of communications events when necessary.

It should be noted that many elements of system 1300 may be included in a system-on-a-chip (SoC) device. These elements may include, but are not limited to, the processing system 1301, a communications interface 1305, audio-video interface 1321, interface devices 1350, and even elements of the storage system 1303 and software 1302.

Interface devices 1350 may include input devices such as a mouse 1351, track pad, keyboard 1352, microphone 1353, a touch device 1354 for receiving a touch gesture from a user, a motion input device 1355 for detecting non-touch gestures and other motions by a user, and other types of input devices and their associated processing elements capable of receiving user input.

The interface devices 1350 may also include output devices such as display screens 1356, speakers 1357, haptic devices for tactile feedback, and other types of output devices. In certain cases, the input and output devices may be combined in a single device, such as a touchscreen display which both depicts images and receives touch gesture input from the user. Visual output may be depicted on the display 1356 in myriad ways, presenting graphical user interface elements, text, images, video, notifications, virtual buttons, virtual keyboards, or any other type of information capable of being depicted in visual form. Other kinds of user interfaces are possible. Interface devices 1350 may also include associated user interface software executed by the OS 1315 in support of the various user input and output devices. Such software assists the OS in communicating user interface hardware events to application programs 1310 using defined mechanisms.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

Certain features that are described in this disclosure in the context of separate embodiments can also be implemented in combination in a single embodiment. Conversely, various features that are described in the context of a single embodiment can be implemented in multiple embodiments separately or in various suitable subcombinations. Also, features described in connection with one combination can be excised from that combination and can be combined with other features in various combinations and subcombinations. Various features can be added to the example embodiments disclosed herein. Also, various features can be omitted from the example embodiments disclosed herein.

When "or" is used herein, it is intended to be used according to its typical meaning in logic, in which both terms being true (e.g., present in an embodiment) also result in configurations having an affirmative truth value. If the "XOR" meaning is intended (in which both terms being true would result in a negative truth value), "xor" or "exclusive or" will be explicitly stated.

Similarly, while operations are depicted in the drawings or described in a particular order, the operations can be performed in a different order than shown or described. Other operations not depicted can be incorporated before, after, or simultaneously with the operations shown or described. In certain circumstances, parallel processing or multitasking using separate processes or threads within an operating system may be used. Also, in some cases, the operations shown or discussed can be omitted or recombined to form various combinations and subcombinations.

In embodiments where video analysis is being used, presence duration for each unique audience entity can be determined from one or more neural networks performing object tracking. Objects are tracked within each frame they are detected in. A common object tracking algorithm example is DeepSORT, which can run alongside an object detection algorithm. This feature would prevent the same object from being counted multiple times, which is very important when tallying audience viewership metrics.

In certain embodiments where video analysis is being used, including two or more audiovisual displays and two or more camera operative units, video stitching or stacking can be included. In both processes each video feed from the two or more camera operative units is combined into one panoramic video feed. After the video feeds are combined, the other software functionality such as object detection, counting, and tracking would then occur. This feature would allow unique audience entities to span multiple camera operative units without being counted multiple times. An example could include a car initially driving on the left side of a media display client apparatus and then moving to the right side of the apparatus. Without video stitching or stacking, this object would be counted each time it was viewed Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

The claims in the instant application are different than those of the parent application or other related applications. Applicant therefore rescinds any disclaimer of claim scope made in the parent application or any predecessor application in relation to the instant application. Any such previous disclaimer and the cited references that it was made to avoid, may need to be revisited. Further, any disclaimer made in the instant application should not be read into or against the parent application.

What is claimed is:

1. A system for providing audience estimation for digital media display sessions displayed on a mobile vehicle, comprising:
   non-transitory computer-readable storage media;
   a processing system;
   an interface system, including a communications interface;
   one or more machine learning models;
   program instructions stored on the computer-readable storage media that, when executed by the processing system, direct the processing system to:
      receive, via the communications interface, object sensor data derived from one or more object sensors during a digital media display session;
      apply an entity classifier produced by the one or more machine learning models to the object sensor data to determine a type of each unique audience entity;
      for each unique audience entity, determine by the one or more machine learning models, from the object sensor data, a presence duration, a proximity, and a direction of the entity during the digital media display session; and
      for each unique audience entity, compute an audience entity quality rating by executing the one or more machine learning models on inputs comprising the type, the presence duration, the proximity, and the direction of the audience entity, the one or more machine learning models outputting the audience entity quality rating.

2. The system of claim 1, comprising further program instructions that, when executed by the processing system, further direct the processing system to:
   detect, from the object sensor data, view obstruction of an at least one client display of a media display client apparatus and determine obstruction duration and obstruction coverage; and
   adjust, for each unique audience entity, the audience entity quality rating according to the obstruction duration and obstruction coverage of the at least one client display.

3. The system of claim 2, wherein detecting view obstruction comprises executing a machine learning model of the one or more machine learning models on the object sensor data, wherein the machine learning model is trained to identify objects and environmental conditions that obstruct the at least one client display.

4. The system of claim 1, comprising further program instructions that, when executed by the processing system, further direct the processing system to:
   determine, from the object sensor data, an attention level of one or more unique audience entities to an at least one client display of a media display client apparatus; and
   adjust an audience entity quality rating according to the attention level for the one or more unique audience entities.

5. The system of claim 1, comprising further program instructions that, when executed by the processing system, further direct the processing system to:
   determine, from the object sensor data, a speed of one or more unique audience entities relative to the least one client display of a media display client apparatus; and
   adjust the audience entity quality rating according to the speed for the one or more unique audience entities.

6. The system of claim 1, wherein determining at least one of the proximity and direction of the entity comprises executing a machine learning model of the one or more machine learning models on the object sensor data, wherein the machine learning model is trained to output proximities and directions of object signatures detected in the object sensor data.

7. The system of claim 1 comprising further program instructions that, when executed by the processing system, further direct the processing system to transmit the audience entity quality rating to an online dashboard.

8. The system of claim 1, wherein applying the entity classifier comprises executing a machine learning model of the one or more machine learning models trained to identify persons and mobile vehicle types from the object sensor data.

9. The system of claim 1, wherein the object sensor data comprises at least one image or video gathered during the digital media display session.

10. The system of claim 9 wherein:
    the object sensor data comprises at least two video streams gathered during the digital media display session; and
    the program instructions are further configured to direct the processing system to stitch the two video streams together.

11. The system of claim 1, wherein the object sensor data comprises RADAR data gathered during the digital media display session.

12. The system of claim 1, wherein the object sensor data comprises LIDAR data gathered during the digital media display session.

13. The system of claim 1, wherein determining the presence duration comprises executing a machine learning model of the one or more machine learning models on the object sensor data, wherein the machine learning model is trained to output durations that object signatures are detected in the object sensor data.

14. The system of claim 1 wherein the program instructions are further configured to direct the processing system to determine, from the object sensor data, and at least one of a proximity and a direction of the entity relative to at least one client display of a media display client apparatus.

15. The system of claim 1 wherein the program instructions are further configured to direct the processing system to transmit the presence duration for each entity to an online dashboard.

16. The system of claim 1 further comprising at least one object sensor, the at least one object sensor comprising at least one camera component.

17. The system of claim 1 comprising further program instructions that, when executed by the processing system, further direct the processing system to transmit the each unique audience entity to an online dashboard.

* * * * *